(12) United States Patent
Dent et al.

(10) Patent No.: US 6,567,475 B1
(45) Date of Patent: May 20, 2003

(54) METHOD AND SYSTEM FOR THE TRANSMISSION, RECEPTION AND PROCESSING OF 4-LEVEL AND 8-LEVEL SIGNALING SYMBOLS

(75) Inventors: Paul W. Dent, Pittsboro, NC (US); Rajaram Ramesh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/222,617

(22) Filed: Dec. 29, 1998

(51) Int. Cl.[7] .................................. H04L 1/00

(52) U.S. Cl. ........................................ 375/286

(58) Field of Search ................... 375/286, 288, 375/264, 272, 279, 308, 261, 280, 281, 284; 332/112, 144, 103, 104; 341/17, 55, 56, 61, 102

(56) References Cited

U.S. PATENT DOCUMENTS

| | | | | |
|---|---|---|---|---|
| 4,077,021 A | * | 2/1978 | Csajka et al. | 332/9 R |
| 4,334,312 A | * | 6/1982 | Yoshida | 375/20 |
| 4,337,458 A | * | 6/1982 | Cohn et al. | 340/347 DD |
| 4,823,361 A | * | 4/1989 | Yoshida | 375/102 |
| 4,833,696 A | | 5/1989 | Ichiyoshi | 375/121 |
| 5,048,059 A | | 9/1991 | Dent | 375/94 |
| 5,070,303 A | | 12/1991 | Dent | 328/145 |
| 5,084,669 A | | 1/1992 | Dent | 324/83 D |

(List continued on next page.)

FOREIGN PATENT DOCUMENTS

| | | | | |
|---|---|---|---|---|
| EP | 0 317 127 A | 5/1989 | ............ | H04L/27/00 |
| WO | WO 95 18494 | 7/1995 | ............. | H04L/1/12 |

OTHER PUBLICATIONS

Gottman, D.M., et al., "Joint Decoding and Carrier Phase Estimation for Trellis Code Modulation", Proceedings of the Military Communications Conference (MILCOM), IEEE, vol. 1, Nov. 6, 1995.

Henkel, W., et al., A Simple Multilevel Block–Coding Scheme with PI/4–QPSK Properties, European Transactions on Telecommunications and Related Technologies, AEI, vol. 4, No. 5, Sep. 1, 1993.

*Primary Examiner*—Don N. Vo
*Assistant Examiner*—Dung X Nguyen
(74) *Attorney, Agent, or Firm*—Coats & Bennett, P.L.L.C.

(57) ABSTRACT

A method and system for the transmission, reception, and processing of 4-level and 8-level signaling symbols is provided. An inventive modulator is provided for modulating 4-level signaling symbols using an 8-level modulator. Further, this inventive modulator is able to produce 4-level modulation when modulating 4-level signaling symbols using an 8-level modulator, where the 4-level modulation represents the 4-level symbol sequence modulated. Further, a constrained/unconstrained demodulator is provided which is able to demodulate both 4-level signaling symbols and 8-level signaling symbols. The inventive demodulator accomplishes this by limiting the number of new symbol hypotheses and path histories to 4 when working with 4-level signaling symbols, and setting the number of new symbol hypotheses and path histories to 8 when working with 8-level signaling symbols. Additionally, an error correction decoder is provided which is also able to decode a demodulated signal which contains both 4-level and 8-level signaling symbols. The inventive error correction decoder accomplishes this by utilizing an interleaver that only places bits in the 2-bit positions of the 3-PSK soft values that correspond to the 2-bits of QPSK to decode 4-level signalling symbols, and utilizing an interleaver that places bits in all three of the possible bit positions of a symbol to decode 8-level signalling symbols.

14 Claims, 18 Drawing Sheets

U.S. PATENT DOCUMENTS

| | | | |
|---|---|---|---|
| 5,091,942 A | 2/1992 | Dent | 380/46 |
| 5,093,848 A | 3/1992 | Raith | 375/97 |
| 5,099,499 A | 3/1992 | Hammar | 375/94 |
| 5,136,616 A | 8/1992 | Dent | 375/94 |
| 5,148,373 A | 9/1992 | Dent | 364/484 |
| 5,151,919 A | 9/1992 | Dent | 375/1 |
| 5,164,961 A | 11/1992 | Gudmundson | 375/11 |
| 5,230,003 A | 7/1993 | Dent et al. | 371/43 |
| 5,241,702 A | 8/1993 | Dent | 455/278.1 |
| 5,282,250 A | 1/1994 | Dent et al. | 380/23 |
| 5,331,666 A | 7/1994 | Dent | 375/94 |
| 5,335,250 A | 8/1994 | Dent et al. | 375/10 |
| 5,347,542 A | 9/1994 | Kurby et al. | 375/17 |
| 5,361,404 A | 11/1994 | Dent | 455/135 |
| 5,390,245 A | 2/1995 | Dent et al. | 380/23 |
| 5,467,374 A | 11/1995 | Chennakeshu et al. | 375/340 |
| 5,499,272 A | 3/1996 | Bottomley | 375/347 |
| 5,530,722 A | 6/1996 | Dent | 375/298 |
| 5,557,645 A | 9/1996 | Dent | 375/340 |
| 5,559,886 A | 9/1996 | Dent et al. | 380/23 |
| 5,568,518 A | 10/1996 | Dent | 375/340 |
| 5,568,520 A | 10/1996 | Lindquist et al. | 375/344 |
| 5,577,087 A | 11/1996 | Furuya | 375/377 |
| 5,673,291 A | 9/1997 | Dent | 375/262 |
| 5,705,959 A * | 1/1998 | O'Loughlin | 332/151 |
| 5,745,523 A | 4/1998 | Dent et al. | 375/216 |
| 5,749,051 A | 5/1998 | Dent | 455/324 |
| 5,796,780 A | 8/1998 | Ramesh | 375/274 |
| 5,841,816 A | 11/1998 | Dent et al. | 375/331 |
| 6,160,855 A * | 12/2000 | Nakamura et al. | 375/280 |
| 6,304,614 B1 * | 10/2001 | Abbaszadeh et al. | 375/279 |

* cited by examiner

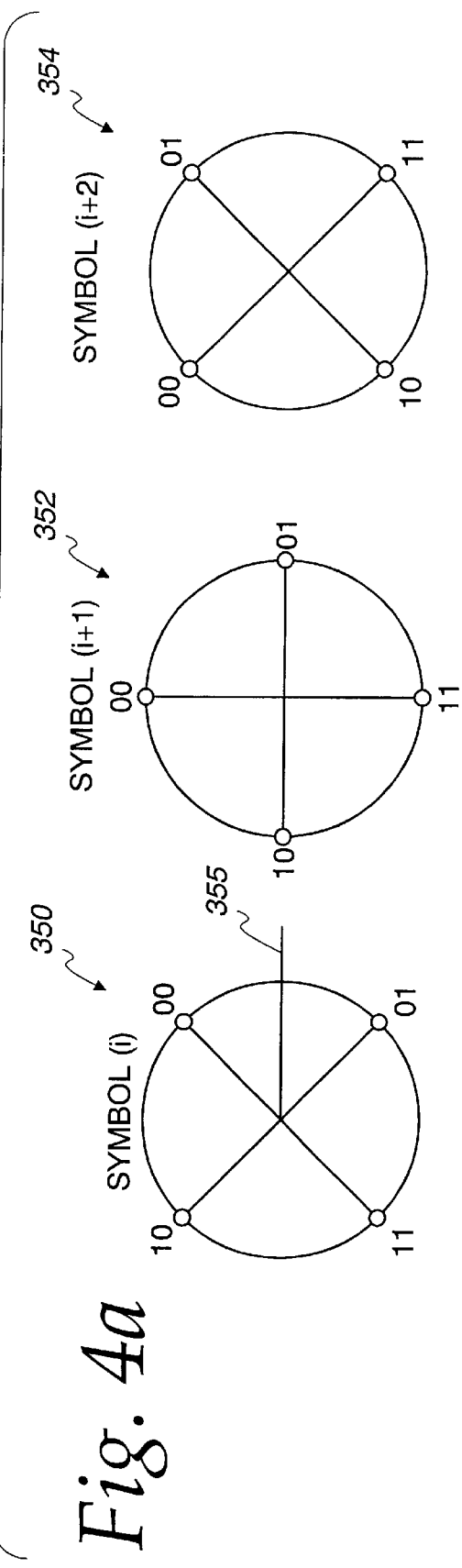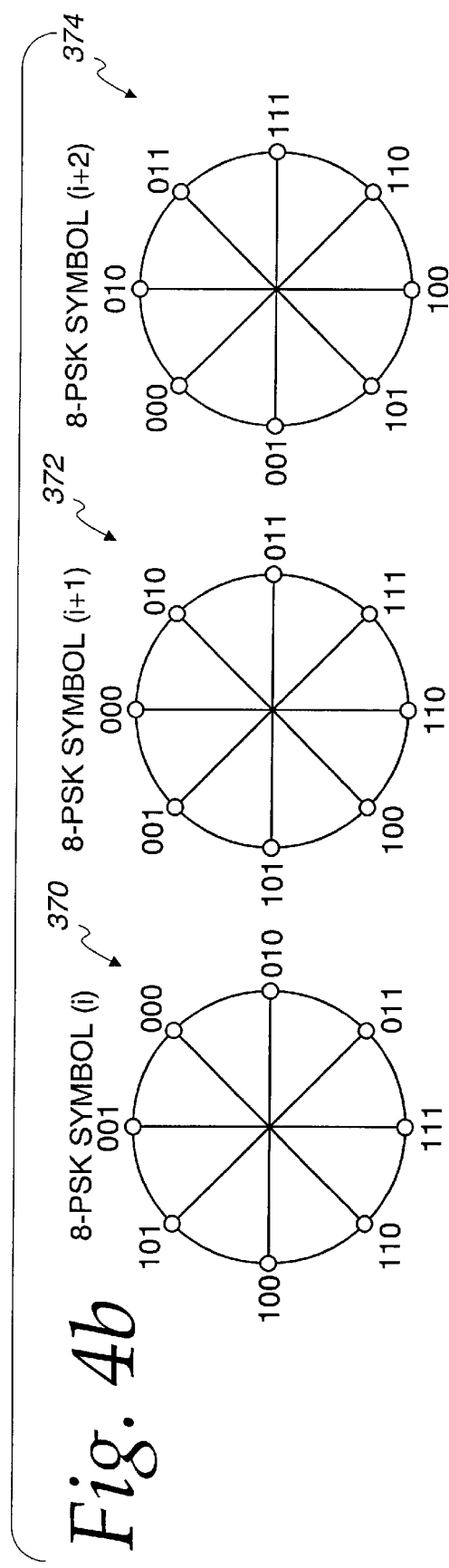

METHOD AND SYSTEM FOR THE TRANSMISSION, RECEPTION AND PROCESSING OF 4-LEVEL AND 8-LEVEL SIGNALING SYMBOLS

FIELD OF THE INVENTION

This invention relates to the transmission and reception of digital data over radio links, and more particularly, to the transmission and reception of 4-level and 8-level signaling symbols according to prevailing conditions so as to achieve a greater data rate when conditions allow.

BACKGROUND OF THE INVENTION

In a typical cellular telephone system, speech compression is used in order to accommodate as many mobile users as possible within the spectrum allocated to any particular operator. Speech compression involves a tradeoff between the total number of users that can be served by the system, and the speech quality delivered by the system. Where less speech compression is used, a better speech quality is achieved; however, less users can be served by the system. Where a greater amount of speech compression is used, the total number of users that can be served by a system is increased; however, the speech quality is degraded. Similarly, there is a tradeoff between the quality of a data communication service and the number of users that can be accommodated by the service. The quality of a data service may be measured in terms of the time required to transfer a data file. Thus, using a higher bit rate may succeed in completing data transfer faster, thereby leading to increased quality of data communications; however, other users are then prevented from using the spectrum at the same time. Additionally, the number of users that can be accommodated in the spectrum may be increased; however, the quality of data communications is degraded. Thus, an improved system would be one which is able to use less speech compression or use a higher bit rate to transmit data, without reducing the number of users that can be accommodated by the system.

Further, in a cellular telephone system, a transmitted signal may travel from a transmitter to a receiver over multiple paths, for example, a direct path and one or more reflected paths. In digital cellular phone systems, an equalizer and an error correction decoder are used to process the received signal which may have traveled over multiple paths. In situations where the received signal contains two modulation types, for example, 4-level modulation and 8-level modulation, two equalizers and two error correction decoders are required to process the received signal, where the first equalizer and first error correction decoder are suitable for processing 4-level modulation and the second equalizer and second error correction decoder are suitable for processing 8-level modulation. This increases the hardware cost of a cellular station since multiple equalizers and error correction decoders are required. Furthermore, in a field where products are being manufactured increasingly smaller for convenience, the user of multiple equalizers and error correction decoders require greater printed circuit board (PCB) real estate, resulting in a physically larger product than cellular stations using only one equalizer and error correction decoder.

The present invention is directed to overcoming one or more of the problems discussed above in a novel and simple manner.

SUMMARY OF THE INVENTION

In accordance with the invention, there is disclosed a method and system for the transmission of both 4-level and 8-level signalling symbols using an 8-level modulator. There is further disclosed a method and system for demodulating and error correction decoding a signal containing both 4-level and 8-level modulation.

It is an object of the present invention to provide a method for modulating 4-level signaling symbols using an 8-level modulator, where the method comprises receiving 4-level signaling symbols to be modulated, where each 4-level signaling symbol contains 2-bits of information. The method further includes expanding the 4-level signaling symbols into eight-level signaling symbols, where each 8-level signaling symbol contains 3-bits of information. The method further includes modulating the 8-level signaling symbols.

In a preferred embodiment, the step of expanding the 4-level signaling symbols into 8-level signaling symbols includes manufacturing a third bit for each 4-level signaling symbol and appending the third bit to the 2-bits of information. In this preferred embodiment, the third bit is the exclusive-OR of the 2-bits. In another preferred embodiment, the method includes performing a progressive 45° phase shift between a modulation of consecutive symbols. In a further preferred embodiment, modulating and expanding 4-levels signaling symbols with the 8-level modulator causes the 8-level modulator to produce 4-level modulation. In a yet further embodiment of the invention, the 4-level signaling symbols are a subset of the 8-level signaling symbols. In another preferred embodiment of the invention, the method includes the step of sending an indication signal indicating which of expanded 4-level signaling symbols and 8-level signaling symbols are being transmitted.

It is another object of the present invention to provide a method for demodulation of a received signal containing at least one of 4-level modulation and 8-level modulation where the method includes demodulating the received signal under a first assumption that the received signal contains 4-level modulation and determining a value of a first quality factor by performing error correction decoding on symbols modulated under the first assumption. The method further includes demodulating the received signal under a second assumption that the received signal contains 8-level modulation and determining a value of a second quality factor by performing error correction decoding on symbols modulated under the second assumption. Additionally, the method determines a received modulation present in the received signal using the first and the second quality factors, and demodulates the received signal as the received modulation.

In a preferred embodiment, the step of determining from the first and second quality factors may be performed before the demodulation under the first and the second assumptions is completed. In a further preferred embodiment, the first and second quality factors are determined using metrics generated by an error correction decoder.

It is another object of the invention to provide a method for demodulating a received signal containing at least one of 4-level modulation and 8-level modulation, where the method determines whether 4-level modulation or 8-level modulation is present in the received signal. The method continues by operating a demodulator in a constrained 4-level demodulation mode by restricting possible levels for the received signal to four levels, determining which level out of the four levels is being received, and producing 4-level signaling symbol decisions having 2-bits each if it is determined that 4-level modulation is present. If however, it is determined that 8-level modulation is present in the received signal, the method continues by operating the demodulator in an unconstrained 8-level demodulation mode by determining which level out of 8 possible levels is being received, and producing 8-level signaling symbol decisions having 3-bits each.

In a preferred embodiment, the step of determining whether 4-level modulation or 8-level modulation is present includes the step of receiving an indication signal indicating whether 4-level modulation or 8-level modulation is present in the received signal. In a further preferred embodiment, the indication signal is transmitted using at least one of a SYNCWORD, a CDVCC, and a FACCH message. In a further preferred embodiment, the step of determining whether 4-level modulation or 8-level modulation is present includes the step of using a predetermined transmission format to determine whether a 4-level signaling symbol or an 8-level signaling symbol is present in the received signal.

It is another object of the invention to provide a method for decoding a received signal containing at least one of 4-level signaling symbols and 8-level signaling symbols, the method comprises receiving a signal, demodulating the received signal as 8-level modulation, and determining whether 4-level signaling symbols or 8-level signaling symbols are present in the received signal. If it is determined that 4-level signaling symbols are present in the received signal, the method operates an error correction decoder in a constrained 4-level decoding mode and produces 4-level signaling symbol decisions having 2-bits each. If it is determined that 8-level signaling symbols are present in the received signal, the method operates the error correction decoder in an unconstrained 8-level mode and produces 8-level signaling symbol decisions having 3-bits each.

In a preferred embodiment, the step of determining whether 4-level signaling symbols or 8-level signaling symbols are present further includes the step of receiving an indication signal indicating whether 4-level signaling symbols or 8-level signaling symbols are present in the received signal. In a further preferred embodiment, the step of determining whether 4-level signaling symbols or 8-level signaling symbols are present further includes the step of using a predetermined transmission format to determine whether 4-level signaling symbols or 8-level signaling symbols are present in the received signal. In another preferred embodiment, the step of decoding the received signal in the unconstrained 8-level mode includes removing a third bit from the 3-bits of the 8-level signaling symbol decision.

It is another object of the invention to provide a method for decoding a received signal containing at least one of 4-level signaling symbols and 8-level signaling symbols, where the method comprises receiving a signal, demodulating the received signal as 8-level modulation, and performing error correction decoding under a first assumption that 4-level signaling symbols are present in the received signal and determining a first quality factor. The method continues by performing error correction decoding under a second assumption that 8-level signaling symbols are present in the received signal and determining a second quality factor. The method then performs the step of determining a received modulation in the received signal using the first and the second quality factors, and decodes the received signal as the received modulation.

In a preferred embodiment, the step of determining from the first and second quality factors may be performed before the decoding under the first and the second assumptions is completed.

It is another object of the invention to provide a system for modulating 4-level signaling symbols using an 8-level signaling symbol modulator, where the system comprises a processor for processing information into a plurality of 4-level signaling symbols to be modulated. The system also includes an expander coupled to the processor for expanding the plurality of 4-level signaling symbols each containing 2-bits of information to expanded 8-level signaling symbols each containing 3-bits of information. The system further includes an 8-level modulator coupled to the expander for modulating the expanded 8-level signaling symbols.

In a preferred embodiment, the system applies a progressive 45° phase shift between the modulation of consecutive symbols. In a further preferred embodiment of the system, the 4-level signaling symbols are a subset of the expanded 8-level signaling symbols. In another preferred embodiment of the invention, the 8-level modulator produces 4-level modulation when modulating the expanded 8-level signaling symbols.

It is yet another object of the invention to provide a system for demodulating a received signal containing at least one of 4-level modulation and 8-level modulation, where the system comprises a receiver for receiving the received signal, and a demodulator coupled to the receiver. The demodulator operates under at least one of a first assumption that the received signal contains 4-level modulation, and a second assumption that the received signal contains 8-level modulation. If the demodulator is operating under the first assumption that the signal contains 4-level modulation, the demodulator operates as a constrained demodulator by restricting the possible levels of the received signal to a set of four levels, determining which level out of the four levels is received, and producing 4-level signaling symbol decisions having 2-bits each. If the demodulator is operating under the second assumption that the received signal contains 8-level modulation the demodulator operates as an unconstrained demodulator by restricting possible levels of the received signal to a set of eight levels, determining which level out of the eight levels is received, and produces 8-level signaling symbol decisions having 3-bits each.

In a preferred embodiment, the system may further include a first error correction decoder coupled to the demodulator and a second error correction decoder coupled to the demodulator, where the first error correction decoder decodes the 4-level signaling symbol decisions when the demodulator is operating under the first assumption, and the second error correction decoder decodes the 8-level signaling symbol decisions when the demodulator is operating under the second assumption. In a further preferred embodiment, a controller is coupled to the first and the second error correction decoders and to the demodulator where the first error correction decoder determines a first quality factor, the second error correction decoder determines a second quality factor, and the controller uses the first and the second quality factors to determine whether 4-level modulation or 8-level modulation is present in the received signal. If the controller determines that 4-level modulation is present, the controller directs the demodulator to operate as the-constrained demodulator, and if the controller determines that 8-level modulation is present, the controller directs the demodulator to operate as the unconstrained demodulator. In-yet another further preferred embodiment, a controller is coupled to the demodulator where the controller determines whether 4-level modulation or 8-level modulation is present in the received signal by using at least one of an indication signal within the received signal and a predetermined transmission format.

It is another object of the invention to provide a system for decoding a signal containing at least one of 4-level modulation and 8-level modulation, where the system comprises a receiver for receiving a signal, and a demodulator coupled to the receiver for demodulating the signal as 8-level modulation. The system also includes an error correction decoder coupled to the demodulator for operating as at least one of a constrained 4-level mode for performing error correction under a first assumption that 4-level signaling symbols are present in the signal, and an unconstrained 8-level mode for performing error correction decoding under a second assumption that 8-level signaling symbols are present in the signal.

In a preferred embodiment, the system comprises a controller coupled to the error correction decoder wherein the error correction decoder determines a first quality factor when operating under the first assumption, and a second quality factor when operating under the second assumption, and the controller determines a received modulation from the first and the second quality factors. The controller then sends a control signal to the error correction decoder to decode the signal as the received modulation. In another preferred embodiment of the invention, the error correction decoder removes a third bit from the 3-bits created by the demodulator when performing error correction decoding under the second assumption. In a further preferred embodiment, the system includes a controller coupled to the error correction decoder wherein the controller determines whether 4-level or 8-level signaling symbols are present in the demodulated signal, and the controller directs the error correction decoder to operate in the constrained mode if it is determined that 4-level signaling symbols are present, and directs the error correction decoder to operate in the unconstrained mode if it is determined that 8-level signaling symbols are present. In a further preferred embodiment, the controller uses at least one of an indication signal within the received signal and a predetermined transmission format to determine whether 4-level or 8-level signaling symbols are present.

BRIEF DESCRIPTION OF THE DRAWINGS

FIG. 4a is a diagram showing allocation of symbols on a QPSK constellation chart, and demonstrating progressive rotation of the QPSK chart where Π/4 DQPSK modulation is utilized;

FIG. 4b is a diagram showing allocation of symbols on an 8-PSK constellation chart and demonstrating progressive rotation of the 8-PSK constellation chart when Π/4 8-PSK modulation is utilized in accordance with the invention;

DETAILED DESCRIPTION OF THE INVENTION

When a cellular system is able to utilize 8-level modulation for the transmission of data over a communications channel, a greater amount of information is passed between the cellular stations than for systems utilizing 4-level modulation, thereby allowing increased voice quality and data transfer. However, the transmission of 8-level modulation requires the prevailing conditions to be such that the receiving station is able to distinguish between the 45° phase shifts in the modulated carrier. Further, even when prevailing conditions allow the use of 8-level modulation, it is desirable to use 4-level modulation for certain fields of the modulated signal, such as the SYNCWORD, to allow cellular stations in neighboring time slots having only 4-level demodulation capability to utilize the transmitted information.

The invention disclosed describes a system and method for modulating both 4-level and 8-level signaling symbols using an 8-level modulator. Thus, increased voice quality or data transfer rate may be utilized in situations where prevailing conditions allow. The invention further describes a demodulator which is able to demodulate both 4-level and 8-level modulation. Additionally, an error correction decoder is provided according to the invention for performing error correction decoding on both 4-level and 8-level signaling symbols. The demodulator and error decoder allow for the demodulation and decoding of signals from a single transmitter which is able to transmit using both 4-level and 8-level modulation. Further, the demodulator and error correction encoder allow demodulation and decoding of transmissions from multiple transmitters, where some transmitters have 4-level modulation capabilities, and others have 8-level modulation capabilities.

Figure 1:
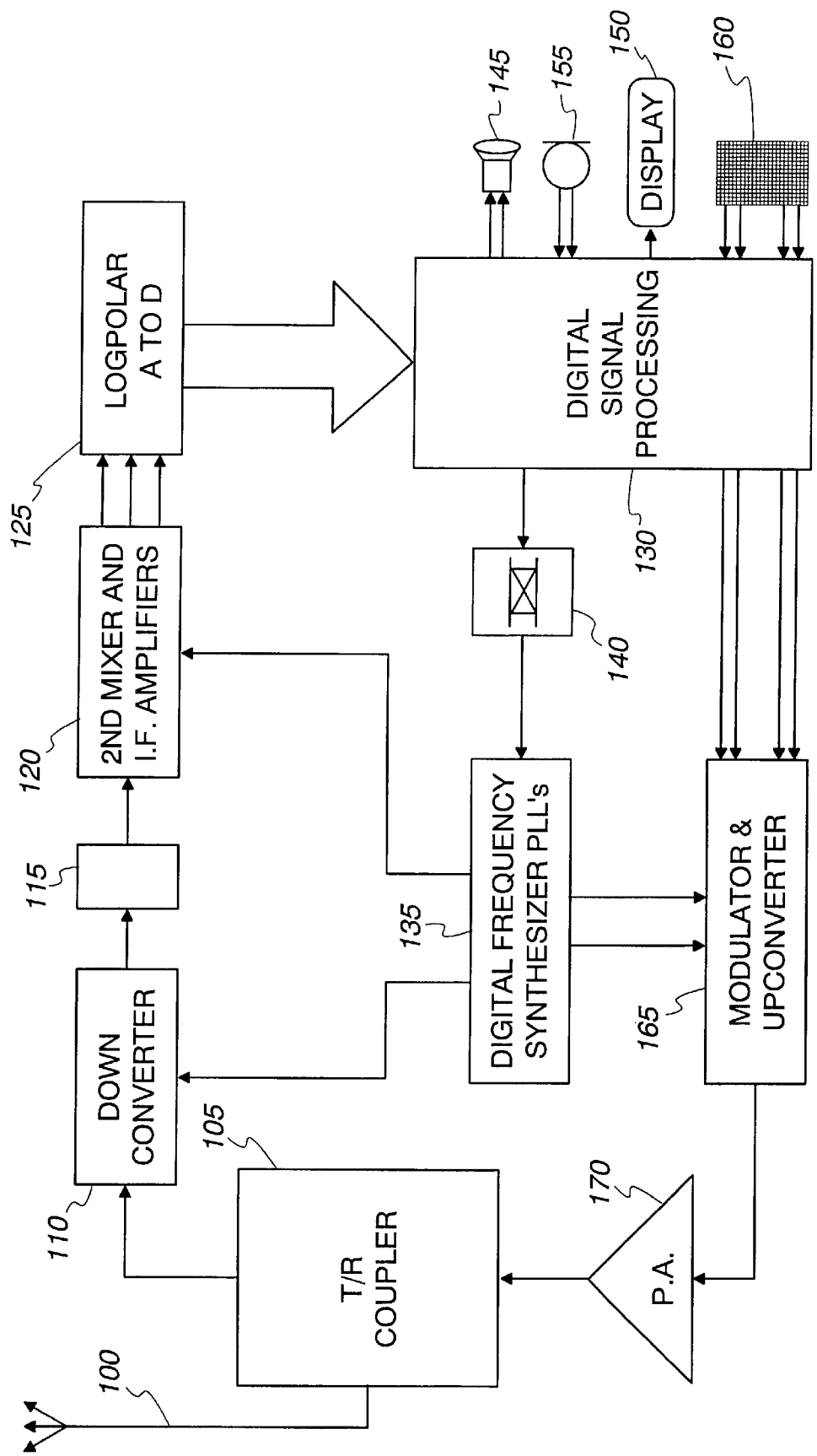
FIG. 1 is a functional block diagram showing a prior art two-way radio.

FIG. 1 illustrates a two-way radio block diagram as known in the art. An antenna 100 is connected through a transmit-receive (T/R) coupler 105 to a receiver section and a transmitter section explained in further detail infra. The T/R coupler can, for example, be either a duplexing filter, as when simultaneous transmission and reception are required, or else a T/R switch, which is a simpler type of coupler that can be used when the technique of time-duplex is used, whereby the transmitter transmits TDMA bursts alternating with reception of TDMA bursts by the receiver. The receiver section includes a down converter 110 for converting received signals to a suitable first intermediate frequency (IF) for filtering by a first IF filter 115, a second mixer and IF amplifier 120 for producing hard-limited second IF signals and a logarithmic signal strength signal (RSSI), which are then converted into numerical form by the log polar converter 125 for processing in the digital signal processing unit 130. First and second local oscillator frequency signals are provided to the down converter 110 and the second mixer 120 by means of a suitable digital frequency synthesizer 135 using phase locked loops. The frequency synthesizer 135 uses a common crystal reference oscillator 140 as an accurate frequency standard and receives programming signals from the digital signal processor 130, which may include a microprocessor, to select different radio channels. The output of the receive signal processing is ultimately either a speech signal to a telephone earpiece 145, a data traffic stream to a user terminal 150, for example a computer display, or alternatively, internal control messages known as slow associated control channel (SACCH) or fast associated control channel (FACCH) messages which control the operation of the device during call setup, call handoff or call termination.

The transmitter section of FIG. 1 includes a source of information to transmit, such as a microphone 155 for speech or a keyboard 160 for entering data. The information entered is coded using error correction coding to protect against transmission errors and then modulated using a modulation technique, such as constant envelope GMSK, as used in European digital cellular systems known as GSM, or alternatively, a varying amplitude (linear) modulation as used in the US IS54 D-AMPS system.

A modulator 165, such as the quadrature modulator disclosed in the U.S. Pat. No. 5,530,722 which can modulate analog or digital signals as useful in dual mode D-AMPS radios that have to operate either in an analog FM mode or a digital mode is hereby incorporated by reference. The '722 patent further describes an improved modulator for modulating Π/4-DQPSK signals on a radio carrier frequency. The modulation may be impressed on a transmit intermediate frequency and then the modulated signal up-converted to the final transmit frequency using a mixing signal from the frequency synthesizer section 135, or alternatively, the frequency synthesizer section 135 can generate an unmodulated final frequency signal which is then modulated using the quadrature modulator 165. The modulated final frequency signal in either case is then amplified by a transmit power amplifier (PA) 170 and transmitted via the T/R coupler 105 by the antenna 100.

Figure 2:
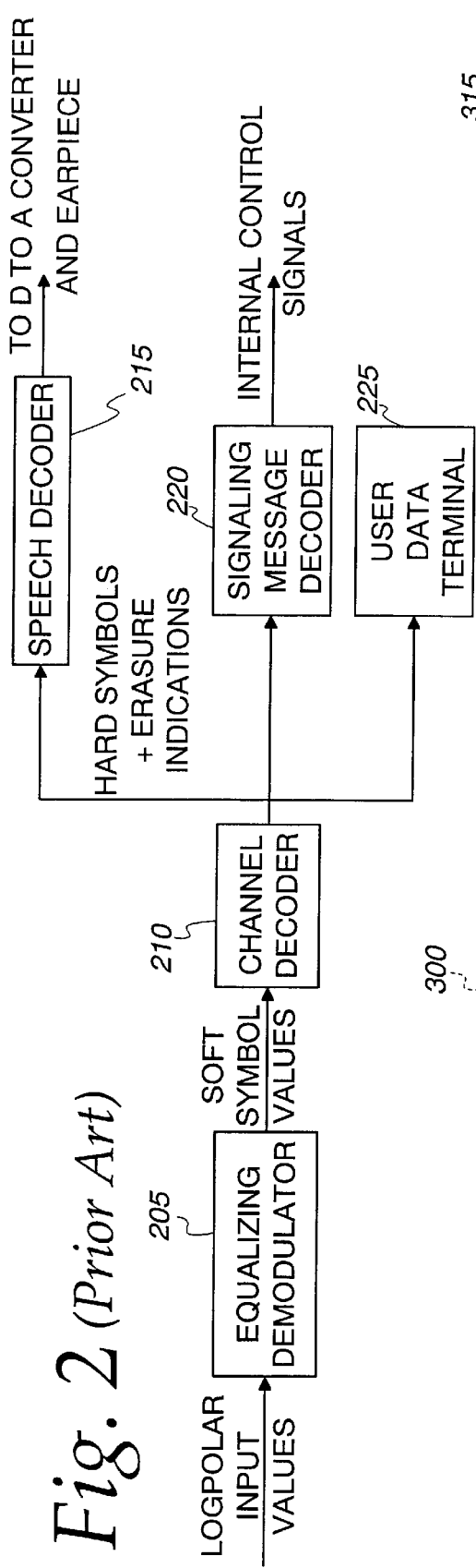
FIG. 2 is a functional block diagram illustrating digital signal processing functions.

FIG. 2 is a functional block diagram illustrating the prior art digital signal processing functions. The digitized samples from the log polar A/D converter 125 are first demodulating using preferably an equalizing demodulator 205 to compensate for intersymbol interference (ISI) added in the transmission path. The equalizing demodulator 205 preferably outputs "soft decisions" rather than hard symbol decisions to the channel decoder 210. One way of deriving soft symbol decisions from the equalizing demodulator 205 is to disclosed in U.S. Patent to Hammar, U.S. Pat. No. 5,099,499 "Method of Generating Quality Factors for Binary Digits Obtained in the Viterbi Analysis of a Signal" which is hereby incorporated by reference herein. The channel decoder 210 performs error correction decoding and may discriminate between different types of coded message, such as speech, data and signalling, using for example the technique described in U.S. Pat. No. 5,230,003 "Decoding System For Distinguishing Different Types Of Convolutionally-encoded Signals," hereby incorporated by reference herein. The channel decoder 210 outputs hard bit or symbols decisions according to the type of message directed to either the speech decoder 215, the signalling message decoder 220 or a user data terminal 225. The channel decoder 210 may also provide erasure indications to any of the above when it detects that decoding was unsuccessful, such as by processing a cyclic redundancy check code (CRC), for example. If the message was speech, the speech decoder 215 first decompresses the compressed speech using a CELP, ECELP, VSELP, or AMBE vocoder algorithm to convert the speech message to a stream of binary coded waveform samples (PCM) and then the PCM samples are D-A converted to regenerate a continuous, analog voiceband signal for driving a loud speaker or ear piece, such as ear piece 145. If alternatively, the message was detected to be a signalling message of FACCH or SACCH type, the channel decoder 210 passes the decoded output to the signalling decoder 220 for further interpretation and action. Signalling messages are sent by a cellular system to a cellular phone in order to control its internal functions, such as the frequency channel it will use for transmission and reception and the transmitter power level it will use. Signalling messages can also request the phone to automatically verify its identity using an authentication process, as described in U.S. Pat. No. 5,559,886 "Method of Carrying Out an Authentication Check between a Base Station and a Mobile Station in a Mobile Radio System", U.S. Pat. No. 5,390,245 "Method of Carrying Out an Authentication Check Between a Base Station and a Mobile Station in a Mobile Radio System", U.S. Pat. No. 5,282,250 "Method of Carrying Out an Authentication Check between a Base Station and a Mobile Station in a Mobile Radio System", and U.S. Pat. No. 5,091,942 "Authentication System for Digital Cellular Communications", which are hereby incorporated by reference herein.

If, on the other hand, the message is neither speech nor signalling, but rather a digital data message intended for some digital data terminal service, such as a personal computer, or alternatively, intended for display on the cellular telephones display, it is routed instead to the user data terminal 225 or display handling software routine via a device driver routine.

A dual mode radio communications device for receiving alternatively analog frequency modulated signals or Π/4-DQPSK digitally modulated signals and transmitting the same is described in U.S. Pat. No. 5,745,523 and is hereby incorporated by reference herein. U.S. Pat. No. 5,048,059 "Log-Polar Signal Processing" describes converting signals received on a radio carrier frequency to an stream of representative numerical samples for digital processing while retaining their complex vector nature and is hereby incorporated by reference herein. Digitizing phase related signals is described in U.S. Pat. No. 5,084,669 "Direct Phase Digitation" and U.S. Pat. No. 5,148,373 "Method and Arrangement for Accurate Digital Determination of the Time or Phase Position of a Signal Pulse Train" which are hereby incorporated by reference herein.

When a logarithmic amplifier generates a logarithmic signal strength indication from multiple amplifier detector stages with interstage filters, relative contributions from different stages are preferably combined using delay compensation as described in U.S. Pat. No. 5,070,303 "Logarithmic amplifier/detector delay compensation" and is hereby incorporated by reference herein. Alternatively, a received radio signal may be down converted and digitized using a HOMODYNE receiver, such as described in U.S. Pat. No. 5,241, 702 "D.C. offset compensation in a radio receiver" which is hereby incorporated herein by reference. Improvements to Homodyne Receivers as described in U.S. Pat. No. 5,568,520 "Slope Drift and Offset Compensation in Zero-IF Receivers" is hereby incorporated by reference herein. Further, improvements to HOMODYNE receivers as described in U.S. Pat. No. 5,749,051 "I.P. 2 Compensation in HOMODYNE Receivers" may be useful in implementing the current invention and is hereby incorporated by reference herein. Additionally, demodulators for demodulating Π/4-DQPSK signals and compensating for ISI end fading are described in U.S. Pat. No. 5,331,666 "Adaptive Maximum Likelihood Demodulator" and U.S. Pat. No. 5,335,250 "Method and Apparatus by Directional Demodulation of Digitally Modulated Signals" describes maximum likelihood demodulation of recorded signal samples in both a time reversed order and a non-time reversed order and selection of each demodulated symbol from the direction of demodulation giving the better result for that symbol. The '666 and '250 patents are hereby incorporated by reference herein. Such demodulators can make use of estimates of the effects of the propagation path on signal phase and amplitude through the use of "channel models" which are updated during the progress of demodulation on the assumption that demodulated symbols are correct.

When several as yet unresolved hypotheses of a demodulated symbol string are simultaneously held in memory for future resolution after receiving more signals, corresponding, multiple unresolved hypotheses for the channel model must be also held, as described in U.S. Pat. No. 5,164,961 "Method and Apparatus for Adapting a Viterbi Algorithm to a Channel Having Varying Transmission Properties" and is hereby incorporated herein by refernce. Any equalizing demodulator that simultaneously estimates unknown symbols and the unknown channel that they were transmitted through is known as a "blind equalizer" and such an algorithm is described in U.S. Pat. No. 5,557,645 "Channel Independent Equalizer Device" which is hereby incorporated by reference herein. Such algorithms are called "channel model per state" algorithms and a channel model can sometimes be simplified to or can additionally comprise an estimate of frequency error and a gain setting constant as described in U.S. Pat. No. 5,136,616 "Method of Rapidly Controlling the Frequency of a Coherent Radio Receiver and Apparatus for Carrying out the Method", and U.S. Pat. No. 5,568,518 "Fast Automatic Gain Control" both of which are hereby incorporated by reference herein. Alternatively, to reduce processing complexity, a single estimate of frequency error can be computed from the demodulated symbol hypothesis having the highest likelihood indication of being correct, as described in U.S. Pat. No. 5,093,848 "Method of Controlling the Frequency of a Coherent Radio Receiver and Apparatus for Carrying out the Method" which is hereby incorporated by reference herein. Another low complexity equalizer demodulator is described in U.S. Pat. No. 5,467, 374 "Low Complexity Adaptive Equalizer for U.S. digital cellular Radio Receivers" which is incorporated by reference herein.

Reception quality in the current invention can be improved by using diversity receivers, as described in U.S. Pat. No. 5,361,404 "Diversity Receiving System" and U.S. patent application Ser. No. 08/218,236, both of which are incorporated herein by reference. The application Ser. No. 08/218,236 also describes using one of a plurality of demodulation algorithms selected from a repetoire of available algorithms according to quantisized sync quality indicators. U.S. patent application Ser. No. 08/305,727 is also hereby incorporated by reference and describes combining the algorithms for demodulation and decoding of a coded radio signal into a single algorithm by appropriate choice of interleaving pattern. The invention described herein comprises further adaptations to the improved Π/4-DQPSK modulator described in the above-incorporated '722 patent.

Figure 3:
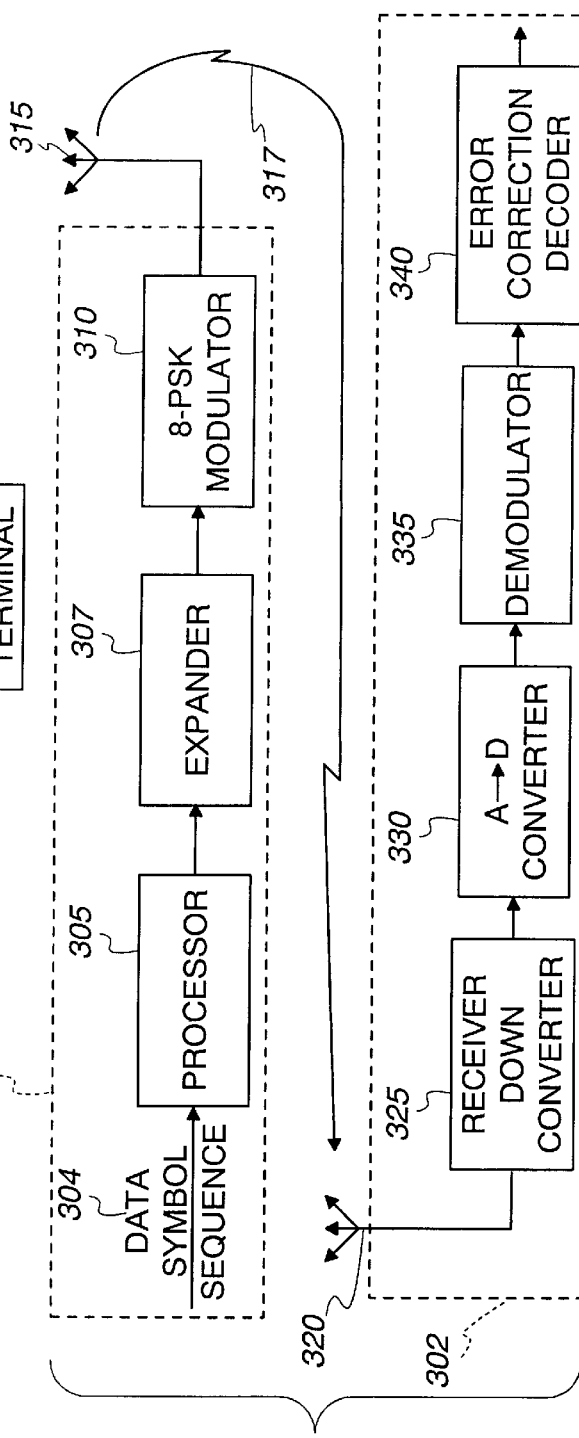
FIG. 3 is a generalized block diagram of a transmitter in communication with a receiver in accordance with the invention.

FIG. 3 is a drawing illustrating the process of transmitting and receiving signals in accordance with the invention. FIG. 3 shows a transmitter 300 in communication with a receiver 302. Transmitter 300 includes a processor 305 coupled to an expander 307 which is coupled to an inventive 8-phase shift keying (8-PSK) modulator 310. Modulator 310 is in turn coupled to transmitting antenna 315. Receiver 302 includes reception antenna 320 which is coupled to, receiver down-converter 325. Receiver down-converter 325 is coupled to analog-to-digital converter 330. Analog-to-digital converter 330 is coupled to an inventive demodulator 335 which is coupled to an inventive error correction decoder 340. The transmitter 300 utilizes an inventive expander 307, and an inventive 8-PSK constellation chart as described infra in reference to FIGS. 4–5. The receiver 302 includes an inventive demodulator 335 and an inventive error correction decoder 340. Demodulator 335 is adapted to demodulate signals containing both 4-level and 8-level modulation, and is described in relation to FIGS. 9–14. Error correction decoder 340 is adapted to decode both 4-level and 8-level signaling symbols and is described in relation to FIGS. 15–19.

As shown in FIG. 3, a sequence of data symbols 304 enters processor 305, which may include an error correction decoder as known in the art, where the data symbol sequence is coded using error correction coding to protect against transmission errors. Processor 305 protects against transmission errors by providing redundancy to the sequence of data symbols 304, where the amount of redundancy depends on the importance of the information encoded in the data symbol sequence. Processor 305 may then output either quadrature phase shift keying (QPSK) or 8-PSK signaling symbols to expander 307. If QPSK signaling symbols are output, expander 307 expands the QPSK symbols to 8-PSK signaling symbols and outputs them to modulator 310. The process that expander 307 uses to expand the signaling symbols will be described infra in relation to FIG. 5. If 8-PSK symbols are output, expander 307 outputs the 8-PSK symbols to modulator 310 without expanding them. The 8-PSK symbols then enter modulator 310 where the 8-PSK symbols are modulated. The modulation may be impressed first on a transmit intermediate frequency and then up-converted to the final transmit frequency using a mixing signal from a frequency synthesizer section such as digital frequency synthesizer 135. The modulated signal is then transmitted from transmission antenna 315 as a transmitted signal 317. The transmitted signal 317 thus contains 8-level or 8-PSK modulation. Although expander 307 is shown as a distinct component, the functions performed by expander 307 may be incorporated into processor 305, modulator 310, or both.

Transmitted signal 317 is received by reception antenna 320 of receiver 302 and enters receiver down converter 325 where transmitted signal 317 is down-converted. The down-converted signal is then digitized by analog-to-digital converter 330. The digitized signal then enters the inventive demodulator 335 to compensate for ISI added in the transmission path. Although the modulation produced by transmitter 300 is 8-PSK in this case, the inventive demodulator 335 has capabilities for demodulating signals having both QPSK and 8-PSK modulation as described in relation to FIGS. 9–14 infra. Demodulator 335 is an adaptive equalizer which applies the maximum likelihood sequence estimation (MLSE) process utilizing the well-known Viterbi algorithm. Demodulator 335 preferably outputs soft decisions to the inventive error correction decoder 340. Error correction decoder 340 performs error correction decoding using the redundancies provided by the processor 305. Error correction decoder 340 is able to decode both QPSK and 8-PSK signaling symbols as described in relation to FIGS. 15–19 infra. The digital information leaving error correction decoder 340 is then further processed by the system to provide, for example, speech, data, and signaling information for the system and users thereof. Although receiver 302 shows both inventive demodulator 335 and inventive error correction decoder 340, only one of the two inventive components need be present for receiver 302 to process transmitted signals comprising QPSK and 8-PSK modulation. In the case where only one of the two inventive components is present in a receiver, the other component may be replaced by one as known in the art. This is shown in further detail in relation to FIGS. 12 and 16.

FIG. 4a shows the allocation of QPSK symbols on a QPSK constellation chart. Such a constellation chart is sufficient for modulating QPSK modulation and Π/4-QPSK modulation as well as differential Π/4-QPSK (Π/4-DQPSK) modulation. Each constellation point represents a pair of data bits. The Π/4-DQPSK used in D-AMPS differs only in the interpretation of the received signal. In Π/4-DQPSK, the two information bits are encoded into a phase change of +/−45° or +/−135° between two successive symbols. The appearance of the transmission, however, is exactly as in FIG. 4a, as successive transmission of a symbol represented by a bit pair will result in a progressive advance of the phase by 45° between successive symbols. This progressive rotation for three consecutive symbols is illustrated by constellation chart 350 for a first symbol (i), constellation chart 352 for a second symbol (i+1), and constellation chart 354 for a third symbol (i+2). Constellation chart 350 shows the allocation of symbols for the 4-level, or QPSK constellation chart. Horizontal reference line 355 represents a 0° reference line used for deriving angular positions of the allocated symbols. It can be seen that in constellation chart 350, the symbols representing bit pairs 00, 10, 11, and 01 are at angular positions 45°, 135°, 225°, and 315° respectively. The data bit pair (00) is for example at angular position 45° for the first symbol, but at angular position 90° for the second symbol, as shown in constellation chart 352 and at angular position 135° for the third symbol, as shown in constellation chart 354. The other bit pairs represented by the constellation points also rotate successively through 45° for each successive symbol while retaining their relative angular relationships.

In Π/4-QPSK, the relative angular relationship of the four possible 2 bit patterns are preferably allocated using Grey coding, in which patterns that differ by only 1 bit are angularly adjacent, while bit patterns that differ by 2 bits are diametrically opposite. This ensures that the most likely form of error, in which one constellation point is mistaken for an adjacent one, only causes a single bit error, while 2 bit errors are caused only in the less likely event of a constellation point being mistaken for a diametrically opposite one. Therefore, it may be seen that Π/4-QPSK modulation comprises transmitting a signal representing one of the 4 possible angular positions 0°, 90°, 180°, and 270° for even symbols, or 45°, 135°, 225°, or 315° for odd symbols. This corresponds to transmitting one of the four complex vectors: (1+0j); 0+j); (−1+0j), or (0−j) for even bits, or (0.707+j 0.707); (−0.707+j0.707); (−0.707−j0.707), or (−0.707−j0.707) for odd bits, where the real and imaginary values are equal to the cosine and the sine of the angle respectively.

In Π/4-DQPSK, the phase change from one symbol to the next, of +/−45° or +/−135° is used to encode the 2 information bits, and phase changes differing by 180° are used to represent bit patterns differing in both bits, while phase changes differing by only 90° are used to represent bit patterns differing in only one bit.

In practice for either Π/4-QPSK or Π/4-DQPSK, the transmit part of the digital signal processor forms sequences of one of the first four complex values alternating with one of the second four complex values and then digitally filters the sequences while up-sampling it to a higher sampling rate, thereby generating multiple samples per 2-bit symbol that are more accurately representative of a desired continuous waveform. It is necessary to transmit a continuous waveform in order to contain the transmission spectrum within an allocated radio channel. The filtering specified for D-AMPS is called "Root Raised Cosine" (RRC) filtering. The RRC filtered and up-converted complex samples (I,Q) are then D/A converted and output to the quadrature modulator and up-converter as described in the above incorporated U.S. Pat. No. 5,530,722. It may be seen that Π/4-DQPSK modulation comprises the transmission of only one of four out of the possible eight phase angles 0°, 45°, 90°, 135°, 180°, 225°, 270° and 315° at each symbol instant, and generation of only one of four out of the possible eight corresponding complex vectors. On the other hand, 8-phase modulation does not restrict transmission to a subset of four phases at each symbol instant, but allows any of the eight to be transmitted, thereby conveying 3 rather than 2-bits of information per symbol.

Figure 5:
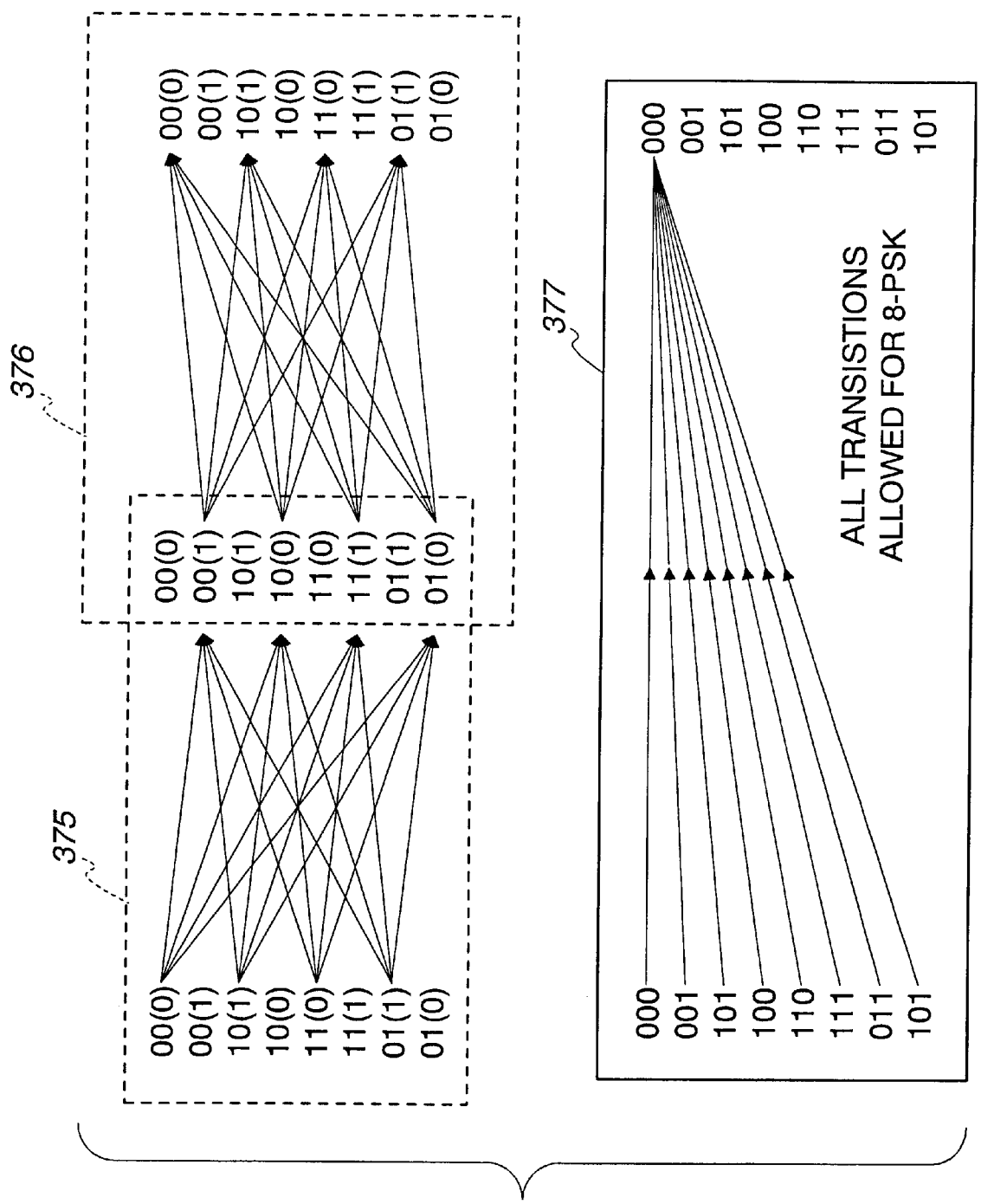
FIG. 5 is a drawing illustrating the allowable symbol transitions for Π/4-DQPSK and 8-PSK constellation charts.

This can be further seen in FIG. 5, which shows the allowable transitions from one constellation point to the next for Π/4-DQPSK and 8-PSK symbols.

FIG. 5 illustrates the allowable transitions from one constellation point to the next for Π/4-DQPSK and 8-PSK. In Π/4-DQPSK, of a previous constellation point was at one of the angular positions 45, 135, 225 or 315°, then the next constellation point transmitted must be at 0, 90, 180 or 270° and vice versa. This is shown in box 375 which illustrates the allowable transitions from an even symbol to an odd symbol, and box 376 illustrates the allowable transitions for an odd symbol to an even symbol. The bit in paranthesis represents the unused third bit of the 8-PSK constellation when Π/4-DQPSK is in use. Box 377 on the other hand illustrates constraints that for 8-PSK, there are no constraints in the transition from one constellation point to the next, where the predecessor to any new point may be any of the eight previous constellation points.

FIG. 4b shows the inventive allocation of symbols for an 8-level, or 8-PSK constellation chart. A 0° reference present at the symbol with corresponding bit pattern 010 maybe used to derive angular positions of the inventive allocated symbols. It can be seen that in constellation chart 370, the symbols represented by the bit trios 010, 000, 001, 101, 100, 110, 111 and 011 are at angular positions 0°, 45°, 90°, 135°, 180°, 225°, 270°, and 315°, respectively. The inventive allocations of symbols at 45°, 135°, 225° and 315° of the 8-PSK constellation chart are derived by generating a third bit for each 2-bit symbol of the QPSK constellation chart shown in FIG. 4a, appending the generated bit to the existing 2-bits for the symbol, and placing this third bit symbol at the angular position on the 8-PSK constellation chart corresponding to the 2-bit symbol position from the QPSK constellation chart. Specifically, the third bit is generated here by exclusive-ORing the 2-bits at each location of the QPSK constellation chart 350. This way of generating the third bit arises from the use of an optimum allocation of the 3-bit patterns to the 8 constellation points, for which no true Grey coding exists in the case of 8 symbols. If any other allocation of the third bit to obtain 8 constellation points is used, the third bit may still be predicted using an appropriate rule when the other 2-bits are given and it is desired to generate Π/4-QPSK. The remaining four allocations of symbols are derived by inverting the least significant bit of the 45°, 135°, 225° and 315° symbol allocations on the 8-PSK constellation chart and placing the bit pattern representing each new symbol at the angular position advanced by 45°.

Any allocation of 8-PSK symbols to constellation points may be used, including variation or not between successive symbols, and as long as it is systematic it is possible to determine which 3-bit symbols will represent the four Π/4-DQPSK symbols at any symbol position in the symbol sequence.

It can be seen that the 2-bits representing each QPSK symbol of constellation chart 350 correspond to the leftmost 2 of the 3-bits representing the 8-PSK symbols at corresponding angular positions on the 8-PSK constellation chart. Thus, the allocation of symbols on the QPSK constellation chart 350 may be considered a subset of the inventive allocation of 8-PSK symbols on constellation chart 370.

This inventive allocation of 8-PSK symbols on an 8-PSK constellation chart allows QPSK signaling symbols to be modulated using an 8-PSK modulator. Further, the inventive allocation allows QPSK modulation to be produced by the 8-PSK modulator. This is shown in conjunction with FIG. 6.

Figure 6:
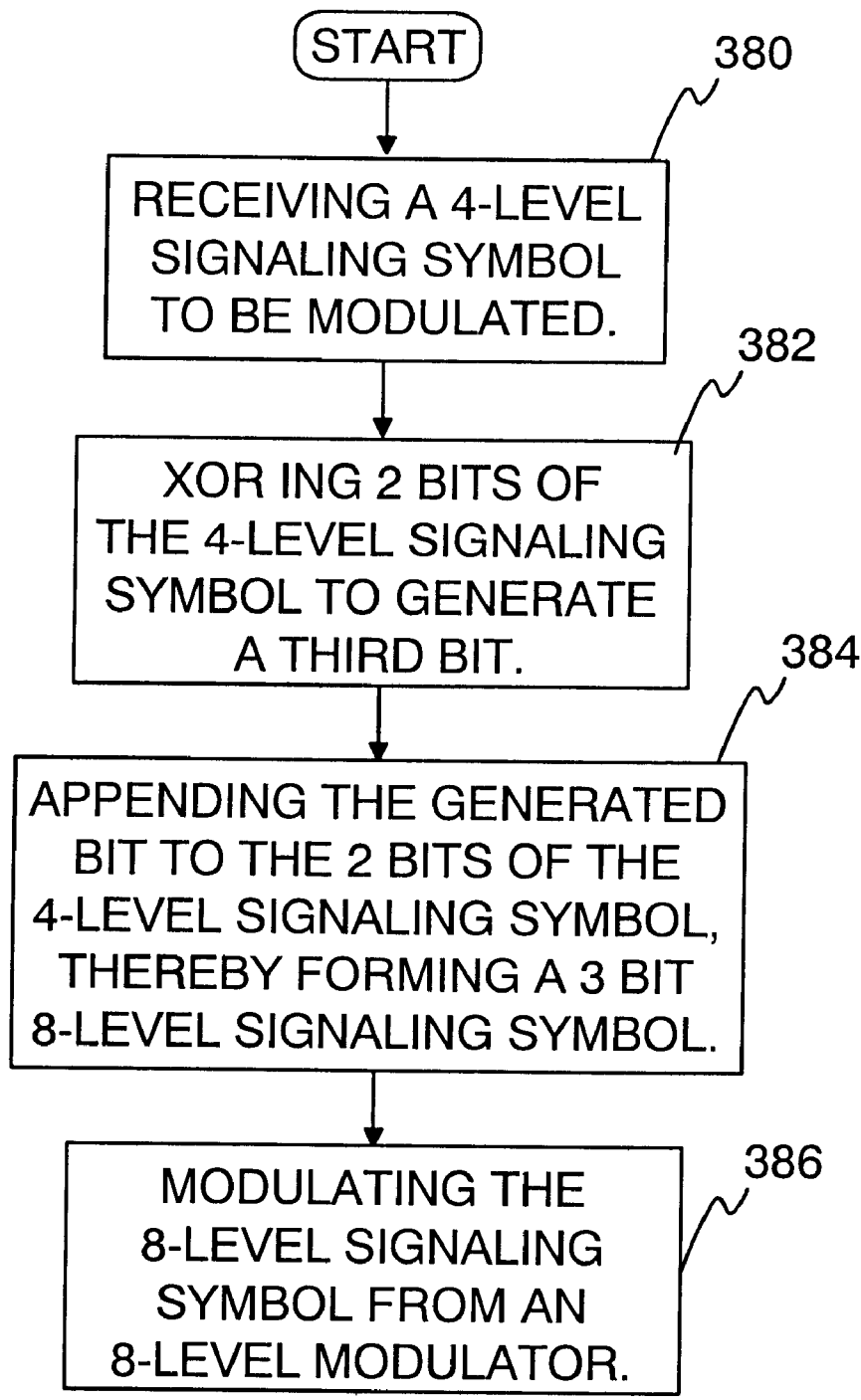
FIG. 6 is a flow chart illustrating the transmission of a 4-level signaling symbol using an 8-level modulator in accordance with an embodiment of the invention.

FIG. 6 shows a flow chart illustrating how QPSK symbols may be transmitted using an 8-PSK modulator in accordance with the invention. In step 380, the processor 305 receives and processes information into a plurality of QPSK signaling symbols which are to be modulated. The QPSK signaling symbols are then expanded to 8-PSK signaling symbols in expander 307. One way of accomplishing this is by exclusive-ORing the 2-bits of information comprising each QPSK signaling symbol to generate a third bit as shown in step 382. The method then continues in step 384 where this third bit is appended to the existing 2-bits of each QPSK signaling symbol. In this way, each signaling symbol is expanded to 3-bits of information representing an 8-PSK signaling symbol. The method continues to step 386 where these 8-PSK signaling symbols are modulated by 8-PSK modulator 310 and transmitted from transmitting antenna 315. In this manner, a QPSK signaling symbol is processed, expanded, and modulated from an 8-PSK modulator.

In the same manner, differential QPSK (DQPSK) signaling symbols may be expanded and modulated by an 8-DPSK modulator utilizing the inventive allocation of symbols shown on constellation chart 370, to produce DQPSK modulation which represents the pre-expanded sequence of DQPSK symbols. It can further be seen that by applying a progressive 45° phase shift to the 8-PSK constellation chart 370, an inventive Π/4-8PSK modulation is created which allows QPSK symbols to be modulated from an Π/4-8PSK modulator to produce Π/4-QPSK modulation by utilizing the invention allocation of symbols on constellation chart 370. This inventive Π/4-8PSK modulation is created by applying the progressive 45° symbol rotation as seen in FIG. 4b. In this case, a first 8-PSK symbol (i) would be transmitted using constellation chart 370. A 45° rotation is then applied to the 8-PSK constellation chart and a second 8-PSK symbol (i+1) is transmitted using constellation chart 372, and a third 8-PSK symbol is transmitted using constellation chart 374 after another 45° symbol rotation is applied.

Thus, when Π/4-DQPSK is used, it is a simple matter to construct the sequence of equivalent Π/4-QPSK symbols, by starting with an arbitrary constellation point, such as angular position 0, and then applying one of the four rotations +/−45° or +/−135° to obtain the next constellation point according to the 2-bits of data. This process continues cumulatively, applying a rotation to the vector used for the previous symbol to obtain the next symbol vector. Likewise, there is a differential form and an absolute form of 8-PSK. The absolute or coherent form of multi-phase modulations was previously known from its use in the 2-phase case in the European cellular system known as GSM, and has later been extended to the multi-phase case in U.S. patent application Ser. No. 08/599,011 entitled "Coherent CPFSK" (Ramesh) filed Feb. 9, 1996 which is hereby incorporated by reference.

When differential 8-PSK is used, a bit triple is represented by one of the eight rotations 0°, 45°, 90°, 135°, 180°, 225°, 270° or 315° being applied cumulatively to the vector transmitted for the previous symbol to obtain the vector for the next symbol. However, every vector transmitted lies at one of the same 8-phase positions and there is no restriction to a first subset of four for even bits or a second subset of four for odd bits, as with Π/4-DQPSK as shown in FIG. 5.

In practice, both Π/4-DQPSK and differential 8-PSK are received, equalized and demodulated first as if they were the coherent or absolute phase versions Π/4-QPSK or coherent 8-PSK, respectively, and then a differential decoding is used to determine the rotation that has occurred between one coherently decoded symbol and the next. Therefore, it will not be necessary to specify whether differential or coherent modulation is used, as the receiver processing is similar in both cases. The main difference is in how soft information is generated for a differential as opposed to coherent modulation, which is discussed infra.

Figure 7A:
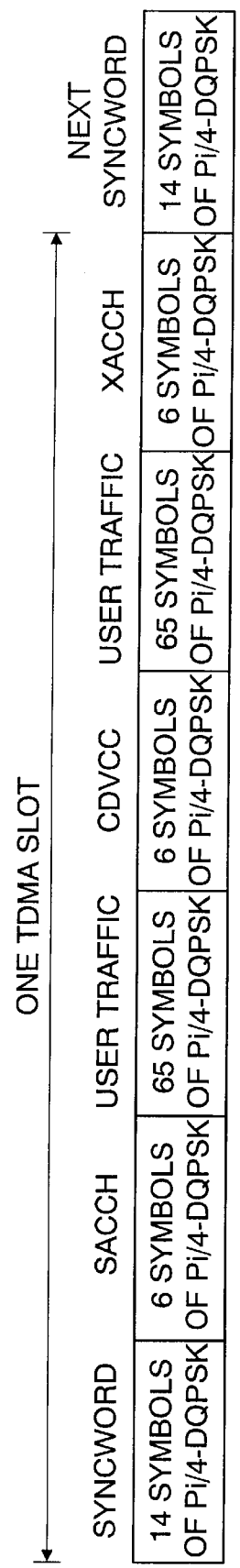
FIG. 7a is a drawing illustrating the prior art IS54 downlink burst format.

FIG. 7a is a drawing illustrating the prior art IS54 burst format. Specifically, FIG. 7a shows a 14 symbol SYNCWORD, 6 symbols of SACCH signalling information, 65 symbols of user speech or data traffic, 6 symbols for a CDVCC, a second 65 symbols of user's speech or data traffic, and an "X" ACCH block of 6 symbols, the "X" signifying that the use of these symbols was unspecified at the time the specification was drafted. The format then repeats starting with the SYNCWORD belonging to the next slot. However, it is well-known and described in the incorporated references that a receiver can advantageously exploit the time-reversal symmetry of the burst format to demodulate either forwards from the first SYNCWORD or backwards from the next SYNCWORD. Thus, a slot which converts the use of 8-PSK must retain its first SYNCWORD in Π/4-DQPSK format for use by a receiver assigned to the previous slot.

Figure 7B:
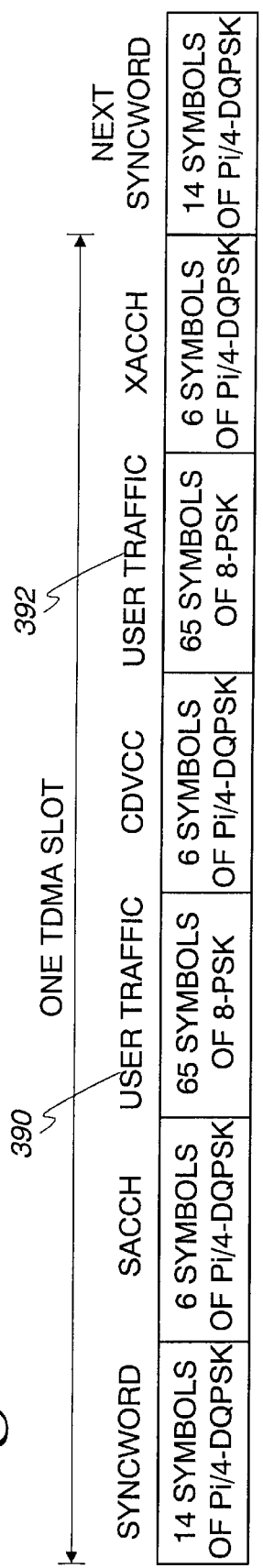
FIG. 7b is a drawing illustrating the modified burst format for enhanced transmission speed in accordance with an embodiment of the invention.

FIG. 7b is a drawing illustrating the modified burst format in a TDMA time slot in accordance with an embodiment of the invention. FIG. 7b specifically shows that the user traffic fields 390 and 392, each containing 65 symbols of information, are converted from Π/4-DQPSK to 8-PSK format, thereby increasing the amount of user data transmitted per burst from 260 bits in the existing IS54 burst format to 390 bits. It is optional to convert any of the other fields, apart from the SYNCWORD to 8-PSK format, although in the later D-AMPS specification IS136, a use is described for the XACCH symbols which suggests their remaining in Π/4-DQPSK format. It is optional also whether the CDVCC field is retained as Π/4-DQPSK, converted to 8-PSK, or eliminated in favor of a higher data rate. One reason for retaining the CDVCC in the Π/4-DQPSK format concerns the transmission of FACCH messages, for which there is no motivation to convert to 8-PSK. In the case of FACCH transmissions, which replace the normal user speech or data symbols, it would be convenient to leave the entire burst in the same format as IS54, apart from a potential change to the symbol interleaving pattern, discussed infra.

Having a system which is able to modulate both QPSK and 8-PSK signaling symbols using only an 8-PSK modulator is advantageous as only one modulator need be present for the modulation of both QPSK and 8-PSK signaling symbols, thereby reducing PCB real estate and reducing production costs as redundant modulators are not necessary. Furthermore, an 8-PSK modulator which is able to produce QPSK modulation is very useful in situations where some cellular stations, for example cellular telephones or cellular base stations, possess QPSK signal processing capability only, and other stations possess 8-PSK signal processing capability. This 8-PSK modulator which is able to produce QPSK modulation has a distinct advantage of being able to communicate to both.

Additionally, in situations where prevailing conditions allow the transmission of 8-PSK signaling symbols, a cellular station is able to transmit more information in any field of a time slot without preventing other users from using the spectrum at the same time. In this way, the cellular station is able to use less speech compression, thereby providing increased speech quality, without reducing the total number of users that can be served by the system. Similarly, the cellular system is able to increase the quality of data communications without reducing the number of users that can be accommodated by the system.

In another aspect of the invention, an inventive adaptive equalizer is provided for demodulating both 4-level signaling symbols and 8-level signaling symbols. Because some transmitters possess 4-level modulation capability and others possess 8-level modulation capabilities, the inventive adaptive equalizer allows communication with both. Additionally, where a single transmitter possesses capabilities for transmitting using both 4-level and 8-level modulation, the inventive adaptive equalizer allows communication for both modulation types, thereby allowing a greater amount of information to be transmitted when prevailing conditions allow.

An adaptive equalizer utilizing the maximum likelihood sequence estimation (MLSE) process may require one last symbol and one current symbol to determine a last symbol transmitted. This assumes the maximum overlap (intersymbol interference) of symbols in the received signals caused by reflected signal paths will be less than or equal one symbol. The adaptive equalizer works by running each last symbol possibility and a corresponding channel model parameter one at a time through a channel model with a new symbol hypothesis. The output of the channel model represents what a received signal sample should look like if the specific last symbol possibility with channel conditions represented by corresponding channel model parameters and the current new symbol hypothesis were transmitted. This channel model output is compared with the actual received signal sample, where a delta metric is computed. The delta metric is the magnitude squared of the difference between the received signal sample and the predicted signal sample. The smaller the delta metric, the more likely it is that the specific last symbol possibility and the current new symbol hypothesis were the transmitted symbols. The delta metric is then added to a cumulative metric for that last symbol possibility, and the new metric is stored into a temporary metric area in a location corresponding to the last symbol possibility. Thus, after each last symbol possibility has been run through the channel model with a single new symbol hypothesis, the temporary metric area holds newly computed temporary metrics for each last symbol possibility for the new symbol hypothesis. The lowest temporary metric is then chosen. The last symbol possibility corresponding to the lowest temporary metric is shifted into the rightmost position of its corresponding path history. The new path history and temporary metric then replace the cumulative metric and path history for the last symbol possibility having the new symbol hypothesis.

Figure 8:
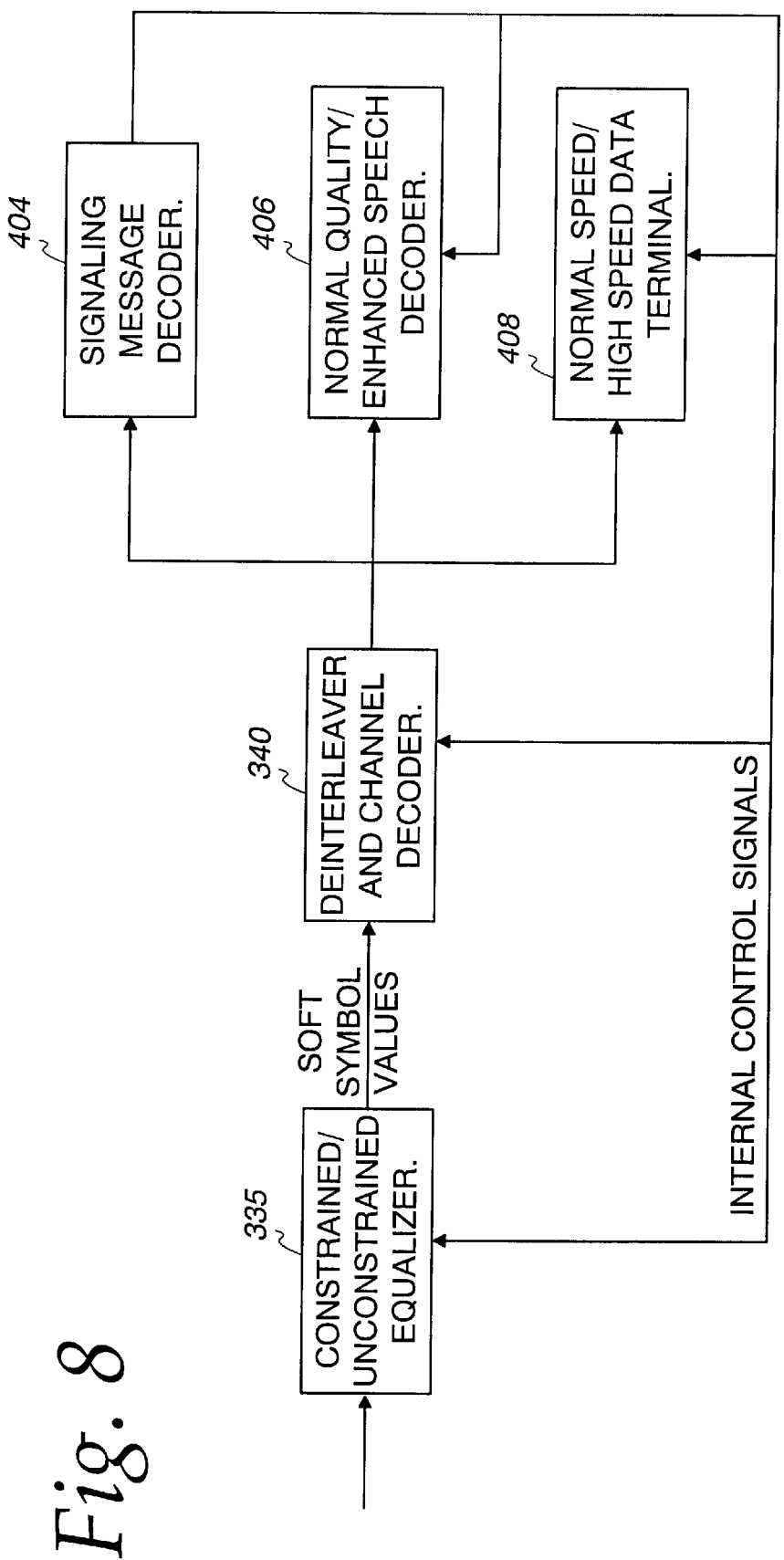
FIG. 8 is a functional block diagram showing signal processing in accordance with the invention.

FIG. 8 is a functional block diagram showing signal processing in accordance with the invention. Specifically, FIG. 8 shows the modifications needed to the signalling processing in a cellular terminal in order to benefit from adaptive transmission bit rates according to the invention. Constrained/unconstrained equalizer 335 is coupled to the deinterleaver and channel decoder 340. Deinterleaver and channel decoder 340 is coupled to signalling message decoder 404, speech decoder 406 and data terminal 408. Constrained/unconstrained equalizer 335, channel decoder 340, signalling message decoder 404, speech decoder 406 and data terminal 408 are further coupled together by means of internal control signal lines. Digitized received samples preserving the complex vector nature of the radio signal are fed into a dual mode equalizer 335 for demodulation. The dual mode equalizer 335 may either be constrained by a control signal to output only soft Π/4-DQPSK decisions, or alternatively, may be unconstrained and then output soft 8-PSK symbols. The soft information is output to the deinterleaver and channel decoder 340, which is also adapted by the control signal to accept either soft 8-PSK symbols or soft Π/4-DQPSK symbols. After decoding and determining if the message was speech, FACCH or data, the decoded message is routed either to the speech decoder 406, the signalling decoder 404, or the user data terminal 408. In the case of decoding 8-PSK where more bits are available to represent speech to a higher quality, the speech decoder 406 is also controlled to operate in an enhanced quality mode. Likewise, for user data reception or transmission at a higher bit rate using 8-PSK, the user data terminal 408 may receive a control signal to cause it to use the higher bit rate. The control signal to switch the equalizer 335, channel decoder 340 and speech decoder 406 between the normal D-AMPS modes may result from reception of a signalling message from the network by the signalling decoder 404. The signalling decoder 404 must therefore be able to receive a message transmitted in Π/4-DQPSK format to switch to 8-PSK format, or vice versa.

The signalling decoder 404 for FACCH can be designed to decode messages transmitted only using Π/4-DQPSK format. Even when the equalizer 335 is conditioned to demodulate 8-PSK, the base station network can transmit a Π/4-DQPSK message and the equalizer 335 will decode it as 8-PSK. If no errors are made, the equalizer 335 will output only one of four possible 8-PSK symbols alternating with one of the other four 8-PSK symbols for each symbol period. However, if errors are made, one of the other 8-PSK symbols can be output. The FACCH decoder operates by hypothesizing the information bits and then using a model of decoding process to determine what the corresponding coded, transmitted bits should be. The interleaver of decoder 340 knows where each bit should be found, for example, in which symbol of which TDMA burst. The predicted bit is thus compared with the soft symbol decision output by the equalizer 335 for that symbol, and the likelihood value computed for whether the symbol contains a bit of the predicted polarity or a bit of the opposite polarity. In computing the likelihood value, a first type of calculation is performed if the equalizer 335 outputs soft 8-PSK symbols, and a second type of calculation is made if the equalizer output soft Π/4-DQPSK symbols. It is also immaterial to the invention whether this computation is located within the channel decoder 340 or perform within the equalizer 335, which would then directly output soft information for each of the three (or two) bits per symbol in a form directly usable by the channel decoder 340. It is the preferred solution to translate soft symbol information into soft information for the two or three constituent bits within the equalizer 335 using a process described infra.

The MLSE processor of constrained/unconstrained equalizer 335 according to the invention is able to operate in a constrained mode for demodulating 4-level or QPSK modulation and an unconstrained mode for demodulating 8-level or 8-PSK modulation. This is accomplished by reducing the number of new symbol hypothesis possibilities and the number of path histories to 4 when operating in a constrained mode, and utilizing 8 new symbol hypotheses possibilities and path histories when operating in an unconstrained mode.

In some situations, it is necessary for the adaptive equalizer according to the invention to switch operation modes from an unconstrained 8-level demodulation mode to a constrained 4-level demodulation mode. These situations include transmitters switching from 8-level modulation to 4-level modulation due to degradation of prevailing conditions thereby preventing the receiver from distinguishing among the smaller phase shifts utilized by 8-PSK modulation, or a switch in communications from a station having a transmitter with 8-level modulation capabilities to a station with a transmitter having only 4-level modulation capabilities. Such a situation may also arise where, although prevailing conditions allow for the transmission of 8-level modulation, it is desirable for certain fields of the transmission for the present time slot, such as the SYNCWORD, to be transmitted using 4-level modulation. (This may arise where a cellular station in a neighboring time slot has only 4-level demodulation capabilities, but needs to access the SYNCWORD of the present time slot.)

Figure 9:
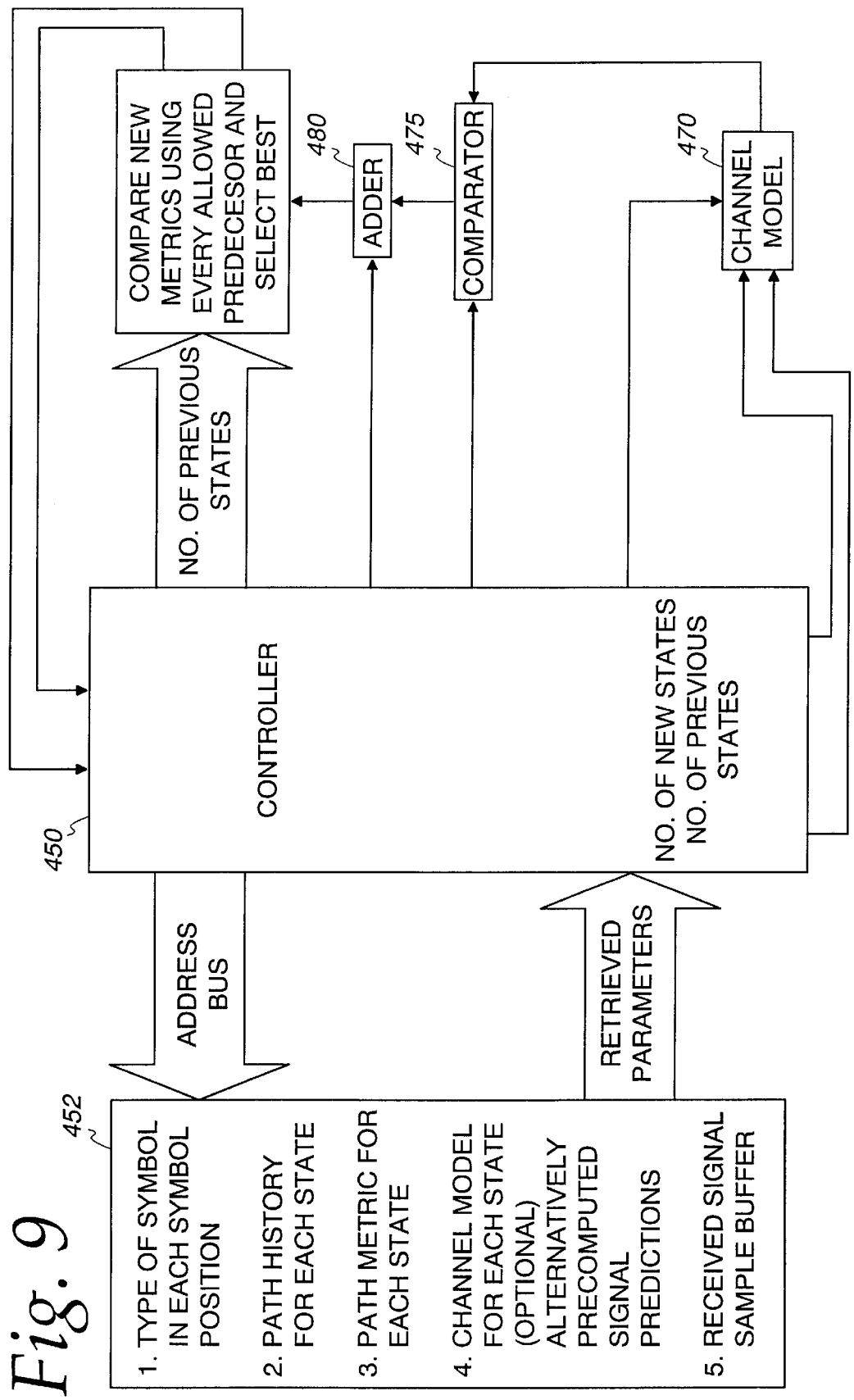
FIG. 9 is a functional block diagram illustrating the sequential MLSE processor in accordance with the invention.

FIG. 9 is a functional block diagram illustrating the sequential MLSE processor in accordance with the invention. FIG. 9 shows a controller 450 coupled to a memory 452, channel model 470, comparator 475 and adder 480. Channel model 470 is further coupled to comparator 475 which is coupled to adder 480. FIG. 9 is shown in further detail in FIG. 10 and the operation of FIG. 9 will be described in relation to FIGS. 10–14.

Figure 10:
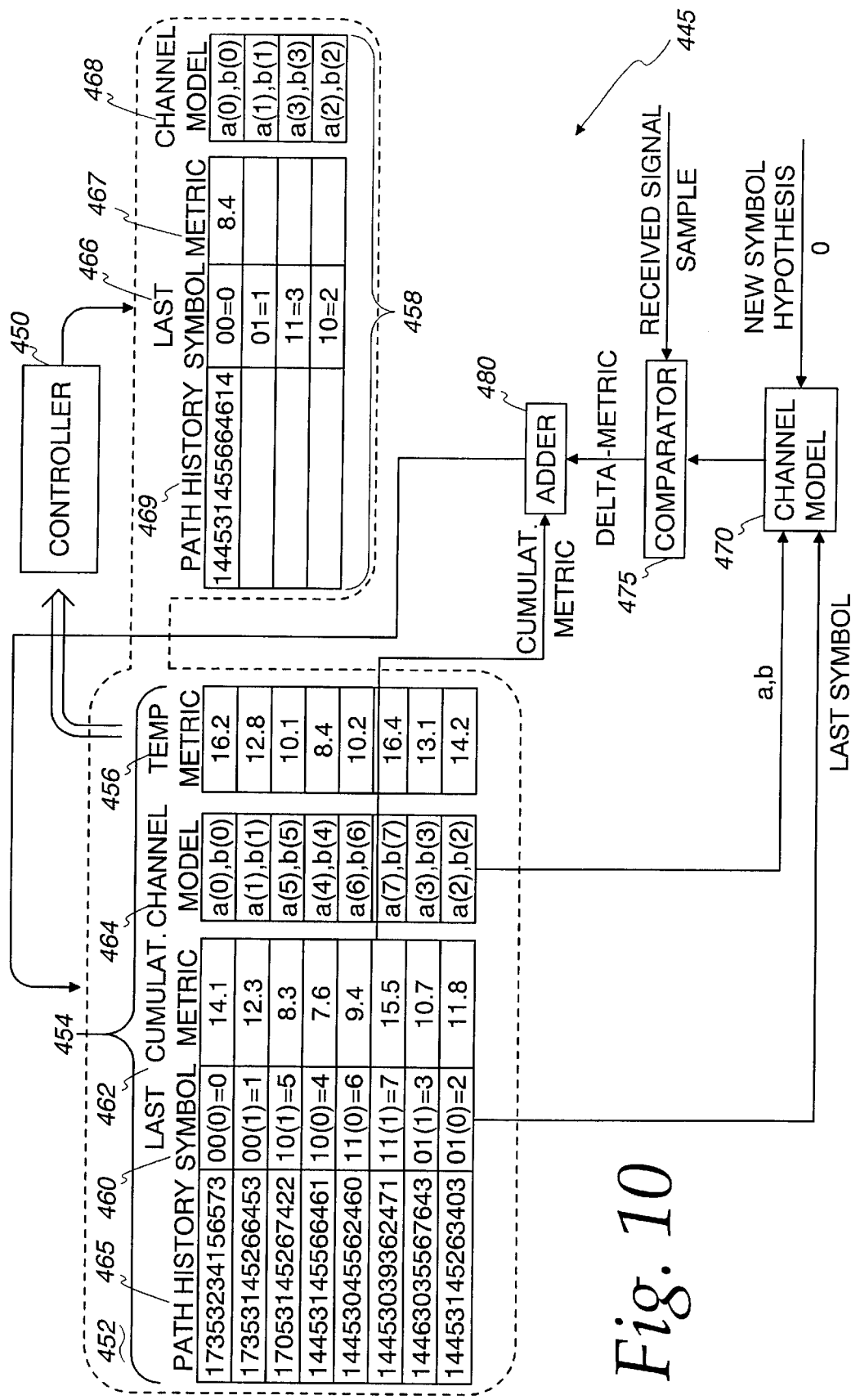
FIG. 10 is a diagram showing an MLSE processor switching from an unconstrained mode to a constrained mode in accordance with the invention.

FIG. 10 is a functional block diagram showing an adaptive equalizer utilizing an MLSE processor switching operation modes from an unconstrained mode to a constrained mode in accordance with the invention. FIG. 10 shows an MLSE processor 445 having a storage device 452 which has a dedicated area 454 representing a current memory table, temporary metric area 456, and an area 458 representing a new memory table. Current memory table 454 includes a last symbol possibility area 460, a cumulative metric area 462, a channel model area 464, and a path history area 465. The last symbol possibility area 460 is in the format of a column which, for 8-PSK signaling symbols has 8 rows. Each row of the last symbol possibility area 460 contains a single last symbol possibility. Cumulative metric area 462 is also in a column format where the number of cumulative metrics is equal to the number of last symbol possibilities, and each cumulative metric corresponds to a specific last symbol possibility of last symbol possibility area 460. Likewise, the channel model area 464 is in a column format and stores channel model parameters for each of the last symbol possibilities in last symbol possibility area 460. Path history area 465 is also in a column format where the number of rows equals the number of last symbol possibilities in the last symbol possibility area 460. Each row of the path history area 465 corresponds to a last symbol possibility of the last symbol possibility area 460.

Temporary metric area 456 has a layout like cumulative metric area 462 and comprises a calculated temporary metric for each last symbol possibility in last symbol possibility area 460.

New memory table 458 includes last symbol possibility area 466, new metric area 467, channel model area 468, and path history area 469, which have layout similar to corresponding areas in the current memory table 454.

The MLSE processor 450 further has a channel model 470 coupled to the last symbol possibility area 460 and channel model area 464. The channel model is then coupled to comparator 475 which is coupled to adder 480. Adder 480 is further coupled to cumulative metric area 462 and temporary metric area 456. Adder 480 and temporary metric area 456 are coupled to controller 450, which is coupled to new memory table 458.

Just prior to switching operation modes from an unconstrained to a constrained mode, the adaptive equalizer according to the invention operates in an unconstrained mode as an 8-PSK adaptive equalizer as known in the art. To switch to a constrained mode in accordance with the invention, the new symbol hypotheses possibilities entering the channel model 470 are limited to four. Each last symbol possibility from last symbol possibility area 460 is run through the channel model 470 with corresponding channel model area 464 parameters and a single new symbol hypothesis. An example is used to demonstrate this.

A last symbol possibility 0 of last symbol possibility area 460 is run with corresponding channel model parameters a(0) and b(0) from channel model area 464 through a channel model 464 with a new symbol hypothesis 0. The result is output to comparator 475 and compared with an actual received signal sample. A delta metric is computed in adder 480. This delta metric is added to the cumulative metric that corresponds to last symbol possibility 0. The sum is stored into the temporary metric area 456 in a location corresponding to last symbol possibility 0. This process is then repeated for the remaining 7 last symbol possibilities in the last symbol possibility area 460 with new symbol hypothesis 0, and a corresponding temporary metric is calculated and stored into temporary metric area 456 for each respective last symbol possibility. Controller 450 then compares each temporary metric in temporary metric area 456 and selects the temporary metric with the lowest value. Here the temporary metric 8.4 corresponding to last symbol possibility 4 is selected. Controller 450 then shifts last symbol possibility 4 into the rightmost position of its corresponding path history in path history area 465 to form a new path history. This new path history and temporary metric corresponding to last symbol possibility 4 of last symbol possibility area 460 is then stored into path history area 469 and new metric area 467 of new memory table 458 corresponding to last symbol possibility 0 of last symbol possibility area 466. New channel model parameters are calculated and stored into channel model area 468 corresponding to last symbol possibility 0 of last symbol possibility area 466. This process is then repeated for new symbol hypotheses 1, 3 and 2, thereby completing the new memory table 458. The MLSE processor 445 then continues the adaptive equalization process operating in a constrained mode as a QPSK adaptive equalizer as known in the art. In this way, the number of new symbol hypotheses have been reduced to 4 to allow the inventive adaptive equalizer to switch from an unconstrained 8-PSK mode to a constrained QPSK mode.

Figure 11:
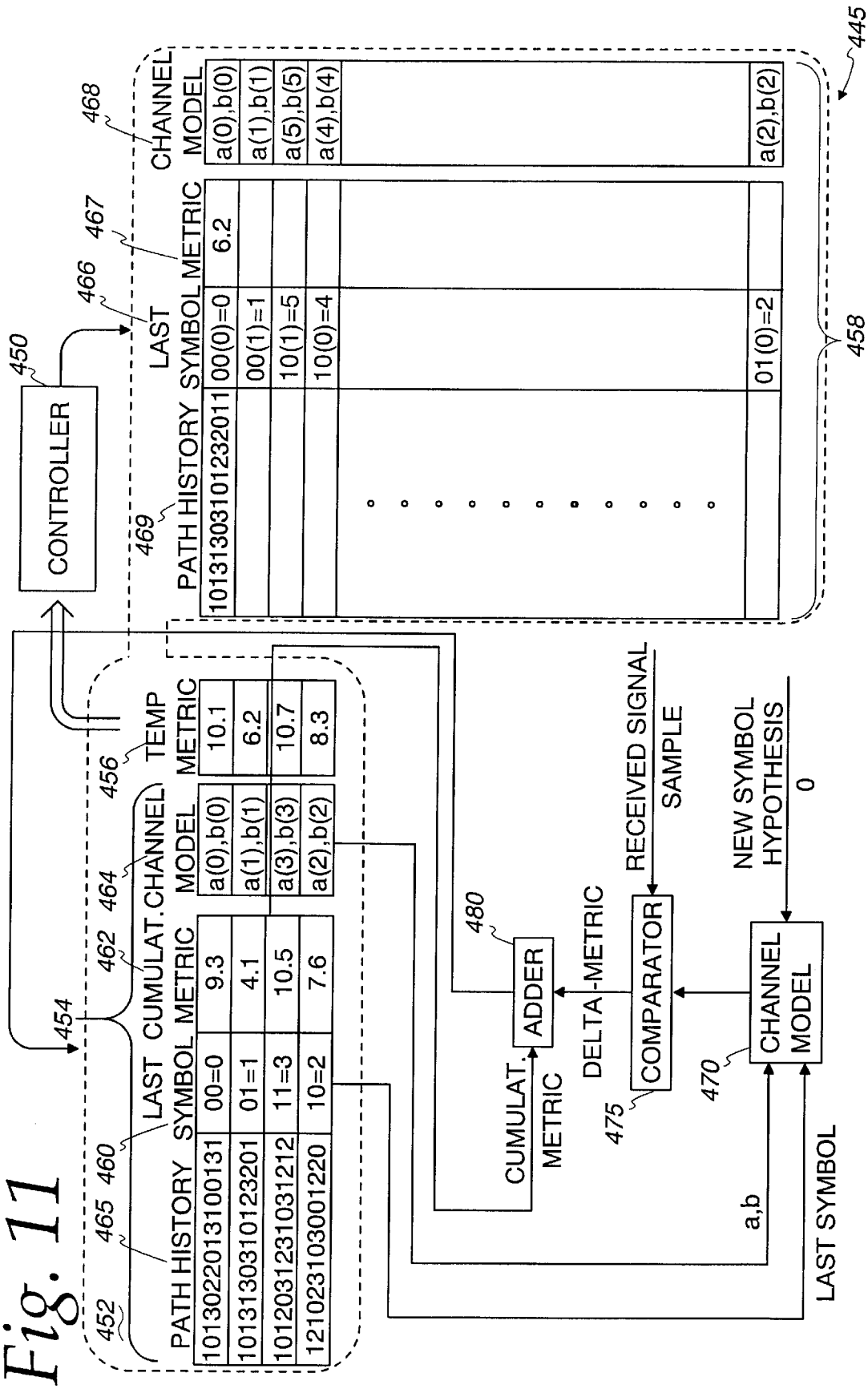
FIG. 11 is a diagram showing an MLSE processor switching from a constrained mode to an unconstrained mode in accordance with the invention.

FIG. 11 is a functional diagram showing an MLSE processor switching from a constrained mode to an unconstrained mode in accordance with the invention. Components of FIG. 11 which correspond with components identified in FIG. 10 have the same identification and a detailed description will not be repeated. The necessity for switching from a constrained mode to an unconstrained mode arises in situations where the prevailing conditions improve, thereby allowing the receiver to distinguish among the smaller phase shifts utilized by 8-PSK modulation, or a switch in communications from a station having a transmitter with 4-level modulation capabilities to a station with a transmitter having 8-level modulation capabilities. Before switching from a constrained mode to an unconstrained mode, the inventive adaptive equalizer will be operating in a constrained mode suitable for adaptively equalizing QPSK signaling symbols as currently known in the art.

To switch from a constrained mode to an unconstrained mode in accordance with the invention, the new symbol hypothesis possibilities entering the channel model 470 are increased to 8. Each last symbol possibility from last symbol possibility area 460 is run through the channel model 470 with corresponding channel model area 464 parameters and a single new symbol hypothesis. An example is used to demonstrate this.

A last symbol possibility 0 of last symbol possibility area 460 is run with corresponding channel model parameters through a channel model 470 with a new symbol hypothesis 0. The result is output to comparator 475 and compared with an actual received signal sample. A delta metric is then computed in adder 480. This delta metric is added to the cumulative metric of cumulative metric area 462 corresponding to last symbol possibility 0. The sum is stored into the temporary metric area 456 corresponding to last symbol possibility 0. This process is then repeated for the remaining 3 last symbol possibilities in the last symbol possibility area 460, and a corresponding temporary metric is calculated and stored into temporary metric area 456 for each respective last symbol possibility.

Controller 450 then compares each temporary metric in temporary metric area 456 and selects the temporary metric with the lowest value, here the temporary metric 6.2 corresponding to last symbol possibility 1. The controller 450 then shifts the last symbol possibility 1 into the rightmost position of its corresponding path history to form a new path history in path history area 465. Controller 450 then stores this path history and corresponding temporary metric into path history area 469 and new metric area 467 of new memory table 458 corresponding to last symbol possibility 0 of last symbol possibility area 466. New channel model parameters are calculated and stored into channel model area 468 corresponding to last symbol possibility 0 of last symbol possibility area 466. This process is then repeated for new symbol hypotheses 1, 5, 4, 6, 7, 3 and 2 to form the new path histories for path history area 469 and metrics for new metric area 467 for memory table 458. MLSE processor 445 then continues to operate in an unconstrained 8-PSK adaptive equalization mode as known in the art. In this way, the number of new symbol hypothesis has been expanded to 8 to allow the inventive adaptive equalizer to switch from a constrained 4-level mode to an unconstrained 8-level mode in accordance with the invention.

Figure 12:
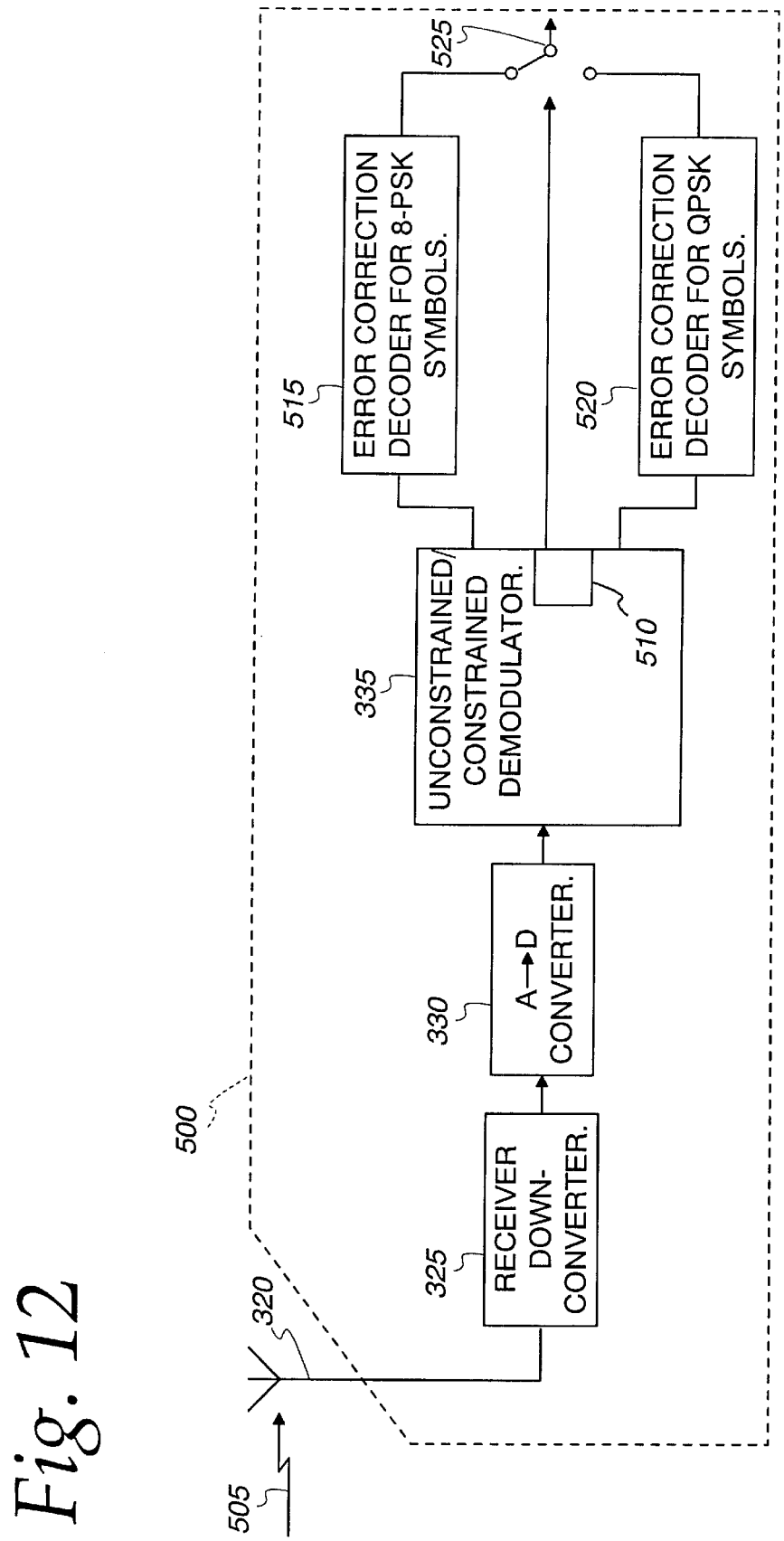
FIG. 12 is a functional block diagram illustrating a cellular station with an unconstrained/constrained demodulator in accordance with an embodiment of the invention.

FIG. 12 is a functional block diagram illustrating a receiver utilizing the inventive MLSE process described in relation to FIGS. 10 and 11. FIG. 12 shows a receiver 500, which comprises a reception antenna 320, coupled to a receiver down-converter 325 which is in turn coupled to an analog-to-digital converter 330. Analog-to-digital converter 330 is further coupled to the inventive demodulator 335, which includes a controller 510. The demodulator 335 is coupled to error correction decoder 515 and error correction decoder 520. Demodulator 335, error correction decoder 515, and error correction decoder 520 are coupled to switch 525. The operation of FIG. 12 will be described in relation to FIGS. 13 and 14.

Figure 13:
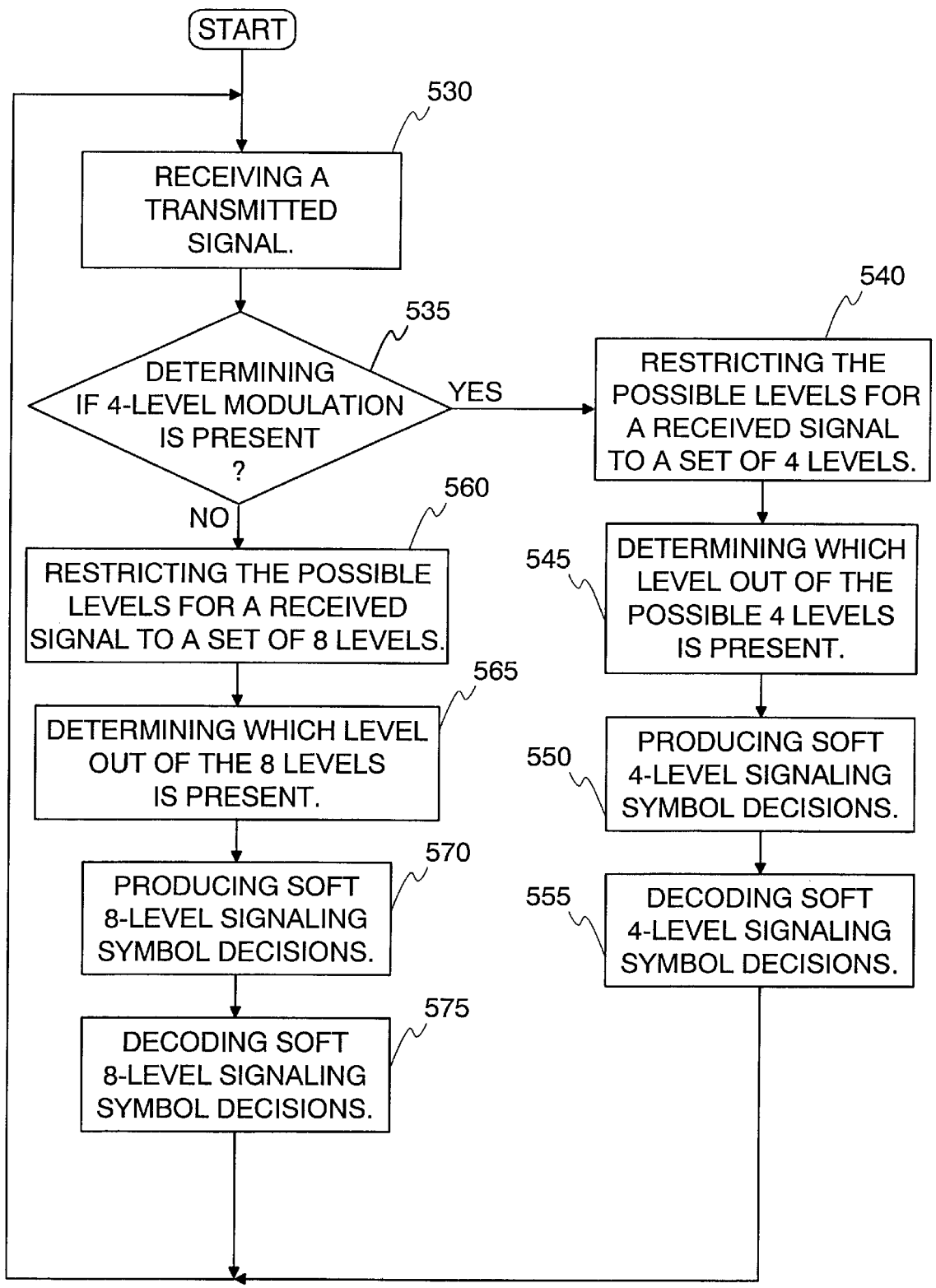
FIG. 13 is a flow chart illustrating the demodulation of a received signal containing at least one of 4-level modulation and 8-level modulation in accordance with an embodiment of the invention.

FIG. 13 is a flow chart showing the steps carried out by a cellular station of a cellular telephone system to demodulate a received signal containing at least one of QPSK and 8-PSK modulation. FIG. 13 begins in step 530 where a transmitted signal 505, which may include either QPSK or 8-PSK modulation, is received by receiving antenna 320. The signal is then filtered and down-converted by receiver down-converter 325 and digitized by analog-to-digital converter 330. The method then continues to step 535 where it is determined whether QPSK or 8-PSK modulation is present in the received signal.

Step 535 may be performed where the inventive demodulator 335 uses a received indication signal, or a predetermined transmission format to determine whether to operate in the unconstrained mode or the constrained mode.

The adaptive equalizer may receive an indication signal indicating which mode it should operate in. This indication signal may be encoded within a SYNCWORD, a Coded Digital Voice Color Code (CDVCC), or a Fast Associated Control Channel Message (FACCH). Currently, there are six available SYNCWORDs in use. To encode the indication signal into the SYNCWORD, a cellular telephone system could use 12 SYNCWORDs where the original 6 SYNCWORDs could indicate when QPSK signaling symbols are to be demodulated, and the new 6 SYNCWORDs could be used to indicate the presence of 8-PSK signaling symbols to be demodulated. Alternatively, the order of the 6 original SYNCWORDs used could indicate whether the demodulator should operate in a constrained mode or an unconstrained mode.

As the CDVCC is specific to the base station, this could also be used as an indication signal indicating whether the inventive adaptive equalizer should operate in a constrained or an unconstrained mode. For example, the CDVCC could be inverted when the adaptive equalizer is to switch from a constrained mode to an unconstrained mode. Alternatively, a flag bit could be used in the CDVCC to indicate that the adaptive equalizer should switch between the unconstrained and constrained modes.

Additionally, the FACCH message could be used to indicate which of constrained or unconstrained modes the inventive adaptive equalizer should operate in.

Furthermore, an indication signal in the form of a control signal could be sent at call setup indicating whether the inventive adaptive equalizer should operate in a constrained or an unconstrained mode. In this circumstance, a received signal strength indication (RSSI) could be used to indicate which of constrained or unconstrained mode is to be used. For example, if the RSSI is above or equal to a threshold, the unconstrained mode would be used as the signal is strong enough to differentiate between the smaller phase shift utilized by the unconstrained mode. However, where the RSSI is below the threshold, the constrained mode would be used as a larger phase shift would be required to adequately transmit the information. Further, a cellular station's capabilities could be used to indicate whether to use the constrained or unconstrained modes. For example, where the other station possesses only 4-level transmission capabilities, the control signal at call set up would set the demodulator to the constrained mode. However, where 8-level transmission capabilities exist, the demodulator would be set to the unconstrained mode.

Additionally, a predetermined transmission format could be used to indicate to the inventive adaptive equalizer whether to operate in a constrained or an unconstrained mode. This predetermined transmission format could include specified fields in a time slot being transmitted using 8-PSK modulation, and other fields in a time slot using QPSK modulation. For example, a format could be set up where only the user traffic field would be transmitted using 8-PSK modulation. All other fields would use QPSK modulation. In this case, the inventive adaptive equalizer would know to operate in an unconstrained mode when demodulating the user traffic field, and a constrained mode for all other fields, such as the SYNCWORD, the CDVCC and the slow access control channel (SACCH). Further, within the user traffic field the predetermined format could be used where a FACCH message could be transmitted using QPSK modulation and the voice data could be transmitted using 8-PSK.

If it is determined that QPSK modulation is present in step 535, the method proceeds to step 540 where the possible levels for the received signal are restricted to a set of four levels, and then to step 545 where it is determined which level out of the four levels is present. If the demodulator 335 was operating in an unconstrained mode prior to step 535, steps 540 and 545 are performed as described in relation to FIG. 10. If the demodulator was operating in a constrained mode however, the demodulator 335 continues to function in the constrained mode and steps 540 and 545 are performed as known in the art. The method then continues to step 550 where soft QPSK symbols are produced by demodulator 335. These soft QPSK symbols are then decoded by error correction decoder 520 suitable for decoding soft QPSK signaling symbol decisions as shown in step 555. The method then returns to step 530.

If it is determined that 8-PSK modulation is present in the signal in step 535, the method continues on to step 560 where the possible levels for a received signal is set to 8. The method continues to step 565 where it is determined which level out of the 8 possible levels is present. If the demodulator 335 was operating in a constrained mode prior to step 535, steps 560 and 565 are performed as described in relation to FIG. 11. If the demodulator was operating in an unconstrained mode, however, the demodulator 335 continues to function in the unconstrained mode and steps 560 and 565 are performed as known in the art. The method then continues to step 570 where soft 8-PSK symbols are produced by demodulator 335. These soft 8-PSK symbols are then decoded by error correction decoder 515 suitable for decoding soft 8-PSK signaling symbol decisions as known in the art, as shown in step 575. The method then returns to step 530.

A controller 510 of FIG. 12 controls a switch 525 which couples the output of the currently functioning error correction decoder to the rest of the cellular station for further processing. Although controller 510 is shown to be within demodulator 335, it may exist independent of demodulator 335. Further, the function of controller 510 may alternatively be performed by either error correction decoder 515 or error correction decoder 520, or by any other processor present in the cellular station.

If an indication signal, a control signal or a predetermined transmission format is not used, the controller 510 may be used to determine whether QPSK modulation or 8-PSK modulation is present in the transmitted signal 505. This is shown in relation to FIG. 14.

Figure 14:
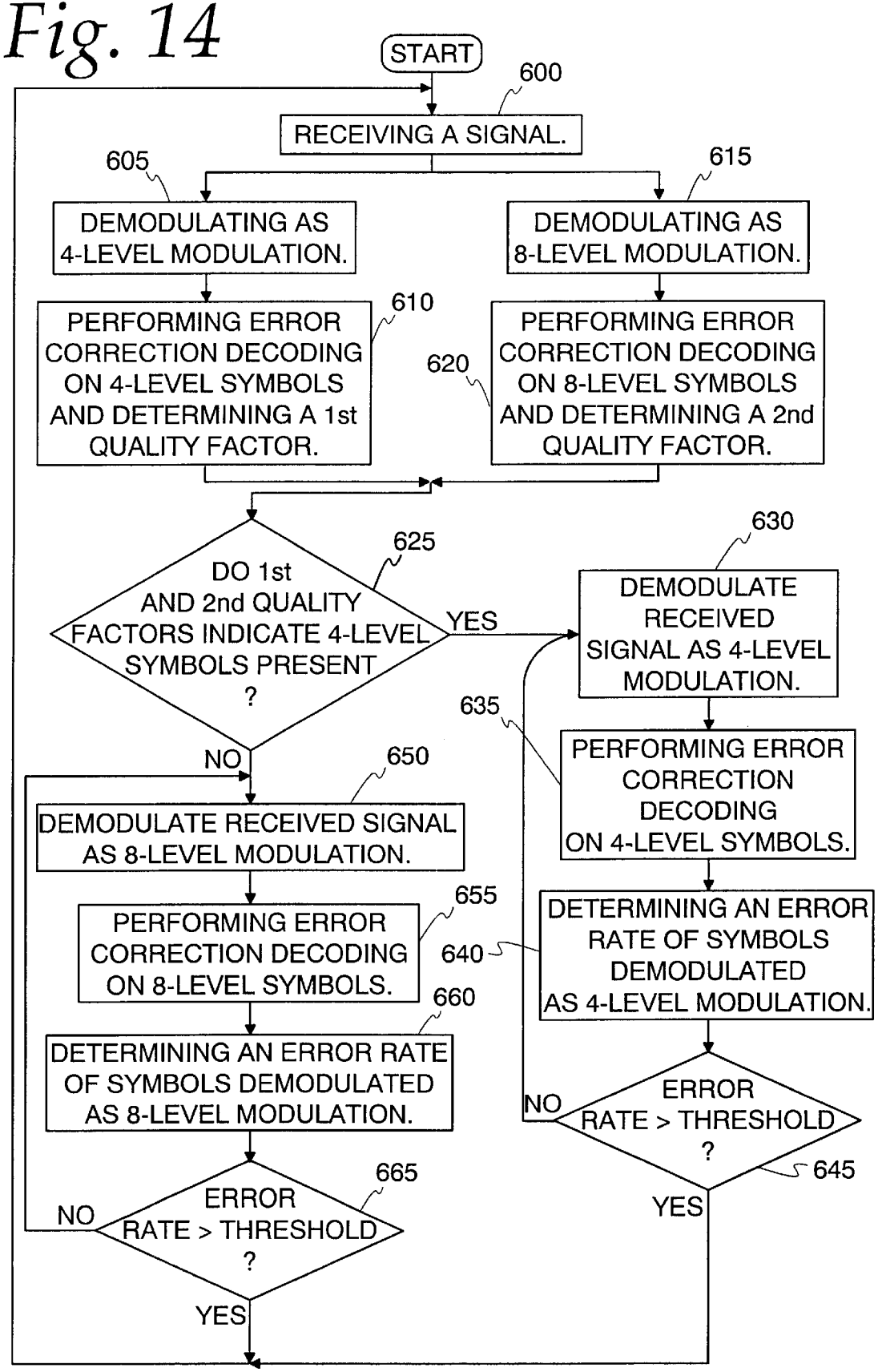
FIG. 14 is a flow chart illustrating the demodulating of a received signal containing at least one of 4-level modulation and 8-level modulation in accordance with an embodiment of the invention.

FIG. 14 is a flow chart showing the steps carried out by a cellular station to demodulate a received signal containing at least one of QPSK and 8-PSK modulation in accordance with another embodiment of the invention. FIG. 14 begins in step 600 where a transmitted signal is received at reception antenna 320. This signal is down converted in receiver down-converter 325 and digitized in analog to digital converter 330. The method then continues to step 605 where the received signal is demodulated by demodulator 335 as QPSK modulation. The method then continues to step 610 where error correction decoding is performed on the QPSK symbols by error correction decoder 520, and the value of a first quality factor is determined. The method also performs step 615 where the received signal is demodulated by demodulator 335 as 8-PSK modulation, and step 620 where error correction decoding is performed by error correction decoder 515 on the 8-PSK symbols and the value of a second quality factor is determined. If the demodulator 335 is operating in an unconstrained mode prior to step 605, the demodulator 335 will switch to a constrained mode as explained in relation to FIG. 10. If the demodulator 335 is operating in a constrained mode prior to step 615, the demodulator 335 will switch to an unconstrained mode as described in relation to FIG. 11. Steps 605 and 610 may be performed simultaneously or close to simultaneously with steps 615 and 620. Alternatively, steps 605 and 610 may be performed sequential to or before steps 615 and 620. The value of the first and second quality factors could be determined using the metrics generated from the MLSE process used in the error correction decoding process. Demodulator 335 employs an adaptive equalizer using the inventive MLSE processor 445 as described in FIGS. 10 and 11 above.

The method then continues on to step 625 where it is determined by controller 510 whether the first and second quality factors indicate if QPSK modulation is present. If it is indicated that QPSK modulation is present, the demodulator 335 will demodulate the received signal as constrained QPSK modulation, as shown in step 630. The method continues on to step 635 where error correction decoding is performed on the QPSK symbols by error correction decoder 520. The method then continues to step 640 where an error rate of the symbols demodulated as QPSK modulation is determined. This error rate could be determined using bit error rates, or cyclic redundancy checks (CRCs), all as known in the art. In step 645, it is determined whether the error rate is greater than a threshold value. If the error rate is not greater than a threshold value, the method returns to step 630. However, if the error rate is greater than a threshold value, the method returns to step 600.

At step 625, if it is determined that QPSK symbols are not present, the method continues to step 650 where the received signal is demodulated by demodulator 335 as 8-PSK modulation. The method then continues to step 655 where error correction decoding is performed by error correction decoder 515 on the 8-PSK symbols. In step 660, an error rate of the symbols demodulated as 8-PSK modulation is determined. This error rate could be calculated as mentioned above in reference to this figure. In step 665, it is determined whether the error rate is greater than a threshold value. If the error rate is not greater than a threshold value, the method returns to step 650. However, if the error rate is greater than a threshold value, the method returns to step 600.

In another aspect of the invention, an error correction decoder is provided for decoding both 4-level signaling symbols and 8-level signaling symbols. Some transmitters possess 4-level modulation capability and others possess 8-level modulation capabilities. Additionally, some transmitters possess capabilities for transmitting using both 4-level and 8-level modulation. Where a receiver does not possess an adaptive equalizer suited to demodulate both 4-level and 8-level modulation, a demodulator suited for demodulating 8-level modulation may be provided with the inventive error correction decoder herein described. Such a combination allows the receiver the same advantages as a receiver utilizing the inventive unconstrained/unconstrained demodulator, set out above in relation to FIG. 10.

A cellular station provides forward error correction where the sequence of data symbols is error encoded and interleaved before modulation and transmission to help protect against transmission errors. To accomplish this, an error correction encoder may contain a shift register which holds a limited number of symbols n. The error encoder then shifts a specific symbol sequence into the shift register n. This specific sequence of signals is processed in a combinatorial logic network to generate a BOOLEAN combination of the bits known as a parity bit. In the case of rate ½ code, the specific sequence of symbols would then be processed in a second combinatorial logic network to generate a second parity bit. These parity bits are then interleaved, grouped to form modulation symbols, modulated and transmitted.

After symbols are received and demodulated, the individual bits of the symbols are deinterleaved (unpacked) and processed by the error correction decoder, using the redundancy provided by the parity bits to correct transmission errors in the received signal.

The demodulator preferably demodulates symbols and uses the MLSE metrics to determine bitwise soft information for each of the 3-bits of each 8-PSK symbol. Due to the specific assignment of 2 or 3-bit groups to 4 or 8 signalling levels as taught herein, when QPSK symbols are demodulated by an 8-PSK demodulator, 2 out of 3 of the demodulated bits will correspond to the 2-bits that would be demodulated by a QPSK demodulator receiving the same signal, and will be represented by soft information related to the log-likelihood of each bit having the given polarity.

When the error correction coded bit stream is modulated into 2-bit (e.g., 4-level) symbols, a first grouping of bit pairs will be used according to a first determined interleaving pattern. For example, the first and 65th encoded bit may be combined to form transmitted symbol No. 15 in a block of transmitted symbols, such as a TDMA burst. This is just an example, and the interleaving table can specify any pairs of bits be combined to form each transmitted symbol, as long as the same interleaving table is used at both the transmitter and the receiver.

When, on the other hand, the error correction coded bitstream is modulated into 3-bit (i.e., 8-level) symbols, a second interleaving table is used to define a second grouping of bits into triples in order to define each symbol. For example, bits 1, 49 and 97 may be combined to define transmitted 8-PSK symbol No. 19.

A receiver for data that has been error correction coded and transmitted using either 4-level modulation and a first interleaving table or 8-level modulation and a second interleaving table employs a copy of both coding and interleaving processes. A first error correction decoder using MSLE to hypothesize information bit sequences, uses a copy of the first coding and interleaving process to determine the coded bit values that would have been sent and into which bits of which modulated symbols they would have been placed. The soft information for those bits of those symbols is then extracted from the demodulated values and used to form metrics for the first error correction decoder, in order to determine the most likely transmitted information sequence under the assumption that 4-level modulation was used.

Also, a second error correction decoder using MSLE to hypothesize information bit sequences employs a copy of the second coding and interleaving process to determine coded bit values and to determine into which of the 3-bits of 8-level modulation symbols they would have been placed. The soft information for those demodulated bits is then used to form metrics for the second error correction decoder, in order to determine the most likely transmitted information sequence under the assumption that 8-level modulation was used.

Inevitably, the decoder that makes the wrong assumption about the modulation and the interleaving will be less able to correctly predict the received symbols and bits and will acquire higher metric values during decoding. Consequently, the decoder that achieves lower metric values is more likely to be making the correct modulation assumption. As described in the incorporated '003 patent, it can be necessary to scale the metrics of the two decoders before comparison in order to obtain the most reliable decision. The scaling may be determined by computer-simulating the system off-line to determine the distribution of metrics for the four cases of decoding as QPSK when QPSK was transmitted, decoding as QPSK when 8-PSK was transmitted, decoding as 8-PSK when QPSK was transmitted, and decoding as 8-PSK when 8-PSK was transmitted.

The metric distributions for QPSK and 8-PSK decoding may be combined into a first two-dimensional distribution for QPSK transmitted and a second two-dimensional distribution for 8-PSK transmitted. Then a line that best separates the two distributions may be drawn to split the two-dimensional plane into two regions, one corresponding to deciding that QPSK was transmitted and the other region corresponding to deciding 8-PSK was transmitted. Then when a pair of metric values from the first and second error correction decoder are available, the region in which they lie may be determined and a decision made on the most likely modulation.

As also described in the incorporated '003 patent, it may be possible to make a reliable decision before decoding an entire block of information to the end. It is possible to compare metrics after partial decoding if simulations indicate that a sufficiently reliable decision could be taken early. After taking a decision to believe the results of one decoder, the other decoder could be terminated to save processing resources. It is even possible to compare metrics after each new bit is decoded, and a decision made if the difference in the metrics is sufficiently strong in favor of one decoder. The disfavored decoder may then be terminated early to save processing resources. If, however, there is no need to save processing resources, both decoders can be allowed to run to completion, and a decoding check, such as a Cyclic Redundancy Check or other error detection code used to determine which decoder to believe. Only then in the rare case of both error detection checks indicating no errors might metric values need to be compared for a final arbitration.

Figure 15:
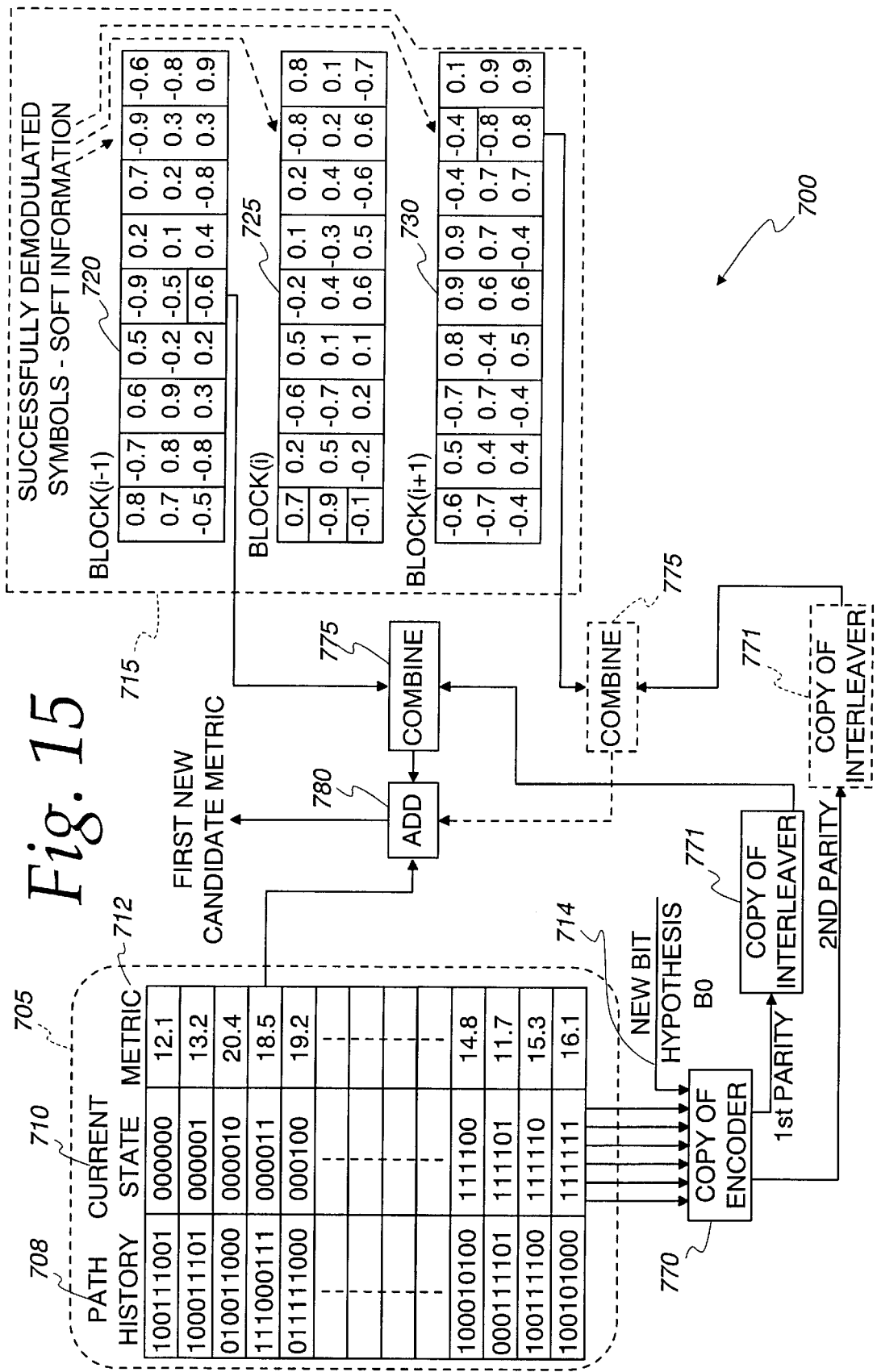
FIG. 15 is a diagram showing an error correction decoder for decoding 4-level and 8-level signal symbols in accordance with the invention.

FIG. 15 illustrates the error correction decoder 700 for the assumption that 8-PSK was transmitted. Error correction encoder 700 includes a memory 705 coupled to a copy of encoder 770 and to an adder 780. Copy of encoder 770 is further coupled to copy of interleaver 771, which is coupled to combiner 775. Combiner 775 is coupled to demodulated information memory 715 and adder 780. Memory 705 includes path history area 708, current state area 710, and metric area 712. Demodulated information memory comprises a plurality of blocks of information, including block (i−1) 720, block (i) 725, and block (i+1) 730. Demodulated information memory 715 comprising blocks of successively soft demodulated symbol values labeled block (i−1) 720, block (i) 725 and block (i+1) 730 contains sets of value triples, each value triple being a symbol demodulated as 8-PSK and then converted to bitwise soft values representative of the likelihood of each bit having the indicated sign polarity. For example, a value −0.8 indicates a likelihood of 0.8 that the bit polarity is negative, while 0.5 indicates a likelihood of 0.5 that the bit polarity is positive. These likelihood values are preferably equal to the logarithm of the ratio of the probability that a coded bit is a "1" to the probability that a coded bit is a "0". A negative value indicates that the probability of a zero, which is on the denominator, is greater than the probability of a "1", and a positive value indicates the reverse.

A memory 705 holds the current status of the decoder 700 and comprises a number of "current states" 710 being sequences of, in this example, six successive bits that were previously hypothesized. These 6-bits together with one new bit hypothesis Bo 714 form a 7-bit input to the copy of encoder 770, which is thus a "constraint length 7" convolution encoder. The encoder 770 produces two parity bits for every pattern of 7-bits presented to it, and is thus a "rate ½" convolutional encoder.

The parity bits for a particular selection of current state 710 and new bit hypothesis Bo 714 are used together with a copy of the interleaver 771 to determine which bits of the demodulation data they should be compared with. In FIG. 15, interleaver 771 has determined that the first parity bit was placed by the transmitter in the third bit of the fifth symbol of block (i−1) 720, which soft value is thus extracted from the demodulated information memory 715 and fed to combiner 775. Combiner 775 combines the parity bit polarity with the soft information polarity to obtain a negative value if the polarities disagree and a positive value if they agree. The combined value is then added to the previous metric from memory 705 that is associated with the selected current state.

Likewise, the second parity bit is determined by interleaver 771 to have been located in the first bit position of the eighth symbol of block (i+1) 730, so that soft value is extracted from demodulated information symbol 715 and combined with the second parity bit in combiner 775 as before, to obtain a second value. This is also added in adder 780 giving a new metric value, which is one of the two possible candidates for the metric of a successor state. The other candidate value is obtained by repeating the process by selecting the current state 710 that differs only in its leftmost bit position. For example, if the first selected state was 000011, the second selected state would be 100011, whichever of the two candidate metrics was the greatest would then be determined. If it was the metric obtained by using selected state 000011, then the candidate metric becomes the new metric for successor state No. 000011 (Bo) and a '0' is shifted into the rightmost position of the path history 708 associated with the selected state, giving 1110001110 as the new 1-bit extended path history. On the other hand, if selected state 100011 gave the greatest new candidate metric value, that new metric value would instead become the metric for successor state 00011 (Bo) and a '1' would be shifted into the rightmost position of the path history 708 associated with selected state 100011 to give the path history 708 for the successor state. When the above process is repeated using first Bo=0 and then Bo=1, two successor states numbered 000110 and 000111 are obtained to replace the two previous states 000011 and 100011. Repeating for all pairs of selected current state thus produces the same number of successor states as previously described. The next iteration then proceeds to process other pairs of soft values from demodulated soft information memory 715, as indicated by the interleaver 771 for the next two parity bit positions.

The above description applies to the 8-PSK assumption because the associated interleaver placed bits in all three of the possible bit positions of a symbol, bit position 1 in the first block 720, bit position 2 of the second block 725, and bit position 3 of the third block 730. The corresponding decoder for the QPSK assumption would use an interleaver that only placed bits in the 2-bit positions of the three 8-PSK soft values that correspond to the 2-bits of QPSK. The third bit in that case would never be selected by the interleaver. Although memory 705 and demodulated information memory 715 are shown as separate memories, the two may be combined into a single memory.

One application of 8-PSK, which allow 50% more bits to be transmitted than QPSK, is to allow use of a speech coder that codes speech using a higher bit rate, thus giving higher quality than existing cellular systems, such as IS54 that use QPSK. IS 54 interleaves one coded speech frame over two successive QPSK bursts to disperse error events. Greater interleaving gives better error dispersion at the expense of greater delay. This may be a good trade-off, and one possibility for the interleaving pattern to use with 8-PSK is to allocate bit 1 of each PSK symbol in burst (i−1), plus bit 2 in burst (i), plus bit 3 in burst (i+1) to transmit coded speech frame number (i−1), thus constructing a 3-burst, diagonal interleaving pattern.

In U.S. Pat. No. 5,673,291 to Dent, which is commonly assigned, a method is disclosed for improving demodulation and decoding of data transmitted by the above method of interleaving, wherein at least one bit per symbol in a TDMA burst belongs to a previously decoded frame of speech or data. The above patent is hereby incorporated by reference herein. Having decoded a previous frame and obtained an indication of correct decoding, such as a CRC check, the TDMA burst may be demodulated again with the already decoded 1-bit per symbol replaced with the now known bit value, effectively reducing the uncertainty in the remaining part of the symbol to be decoded by a factor of two. For example, if the symbols were 8-PSK, but 1-bit of certain symbols are now known as a result of decoding a previous frame, those symbols may now be demodulated as QPSK symbols. If, after decoding a further frame successfully, 2-bits of certain symbols are known, those symbols may be redemodulated as 2-PSK symbols. To obtain maximum advantage from the reduction of the constellation size, the remaining two possibilities in the latter case should ideally be diametrically opposite symbols. However, the constellation of FIG. 4b does not have this characteristic as the remaining two symbols after defining the rightmost 2-bits are 135° apart. Likewise, if 1-bit of a symbol has already been determined, the remaining four possibilities should ideally form a QPSK constellation, i.e., be 90° apart. However, the constellation of FIG. 4b does not have this characteristic as the four remaining possibilities after defining the rightmost bit are separated by alternately 45° and 135° instead of 90°. The above incorporated '291 patent also disclosed that, in the case that a previous frame did not decode correctly, but the subsequent frame did decode correctly, TDMA bursts containing bits of the subsequently correctly decoded frame can be re-demodulated using the correctly decoded bits in each symbol as known values. To obtain maximum advantage from-such "multi-pass" decoding, the remaining constellation points containing the bits of previous frames, after substituting a fixed value for the one of the 3-bits of each symbol just correctly decoded, should ideally form a QPSK constellation. Thus, when multi-pass decoding is to be used in conjunction with diagonal interleaving, a constellation having exactly the opposite of the Grey coded property of FIG. 4b may be optimum, namely, adjacent constellation points should have the maximum number of bits different.

IS54 requires occasionally to steal a speech frame in order to transmit an urgent Fast Associated Control Channel message (FACCH). An FACCH message only comprises 65-bits before coding, and so is coded using a rate ¼ code in IS54 to obtain 260-bits, which replace 130 of the speech bits in one TDMA slot and the other 130 bits of the speech frame in the same slot of the next TDMA frame. Using 8-PSK, the number of information symbols per frame would preferably remain as 130, but each now carries 3-bits of information, making 390-bits available per 20 mS TDMA frame for carrying coded speech. A 13 kilobit per second speech coder giving high speech quality can be used, and coded using a rate ⅔rds code to give 19.5 kilobits/sec., which fills the 390-bits per 20 mS available. The rate ⅔rds error correction code is preferably a punctured convolutional code which, although appearing to be rate ⅔rds on average, provides a lower rate, i.e., more error protection coding, for the more important speech bits and a higher rate code, i.e., less error protection, for the less important speech bits.

One method of stealing an 8-PSK speech frame to replace by FACCH data is to also code the 65 FACCH bits to 390 bits by using a rate ⅙th code. The invention of the '003 patent may then be applied to determine whether a given frame contains rate ⅔rds coded speech or rate ⅙th coded FACCH. Alternatively, if a speech frame is omitted when a 3-frame diagonal interleaving is employed, this effectively allows the three frames that would have each contained 1-bit per symbol of the omitted frame to use 2-bits per symbol, i.e., QPSK instead. To now insert an FACCH message does not necessarily require all of the now QPSK symbols to be converted back to 8-PSK symbols to provide the extra bits. If, for example, half of the 130 symbols per frame were converted back to 8-PSK symbols, thereby providing 65-bits in each of three successive frames, this could accommodate the 65 FACCH bits using rate ⅓ coding. This invention is particularly useful then for detecting frames in which some symbols are 8-PSK symbols carrying a mixture of speech and FACCH data coded in their respective ways, alternatively, 8-PSK symbols carrying high quality encoded speech or yet again QPSK symbols carrying normal quality encoded speech.

Figure 16:
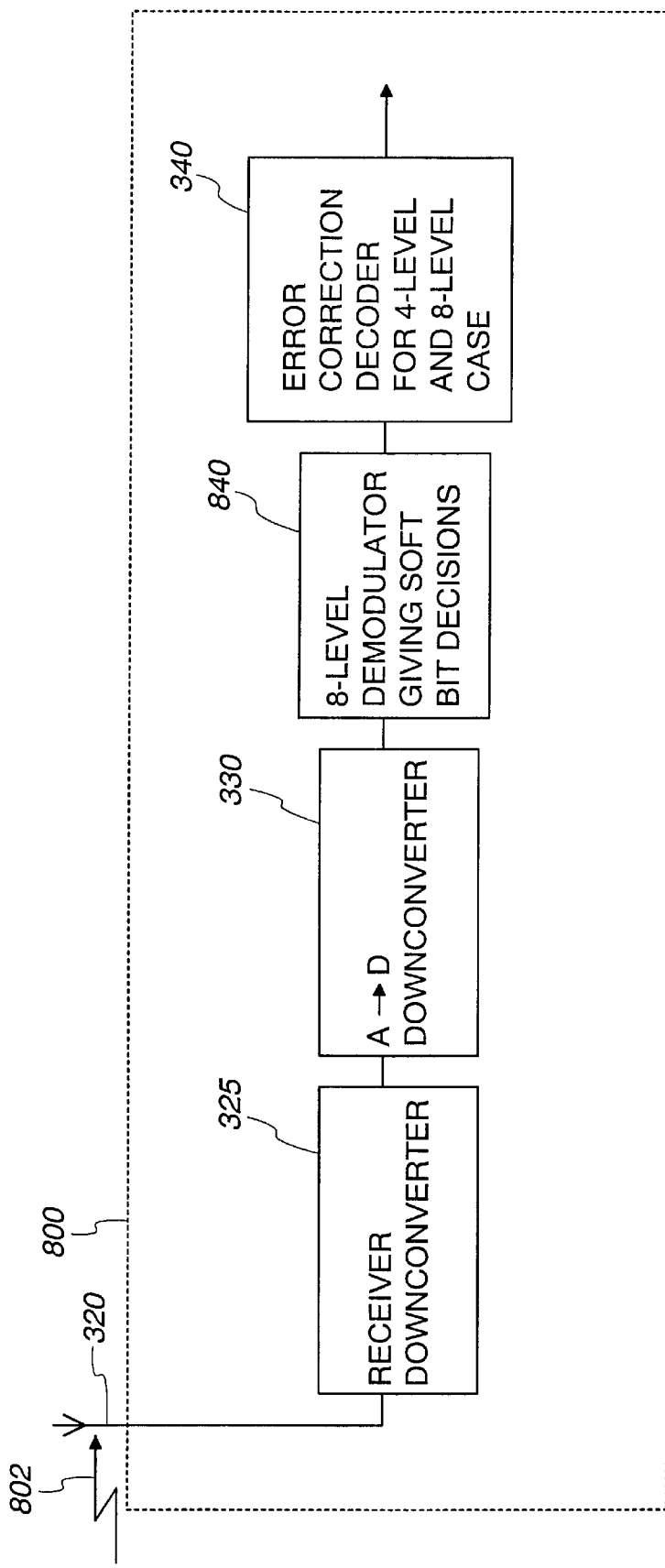
FIG. 16 is a functional block diagram illustrating a cellular station with an unconstrained/constrained error correction decoder in accordance with an embodiment of the invention.

FIG. 16 is a functional block diagram illustrating a cellular receiver utilizing the inventive error correction decoder. Cellular receiver 800 comprises a reception antenna 320 coupled to a receiver down converter 325. Receiver down converter 325 is then coupled to analog-to-digital converter 330 which is further coupled to 8-PSK demodulator 840. 8-PSK demodulator 840 is then coupled to error correction decoder 340. Operation of the receiver having inventive error correction decoder 340 will be discussed in relation to FIGS. 17, 18 and 19.

Figure 17:
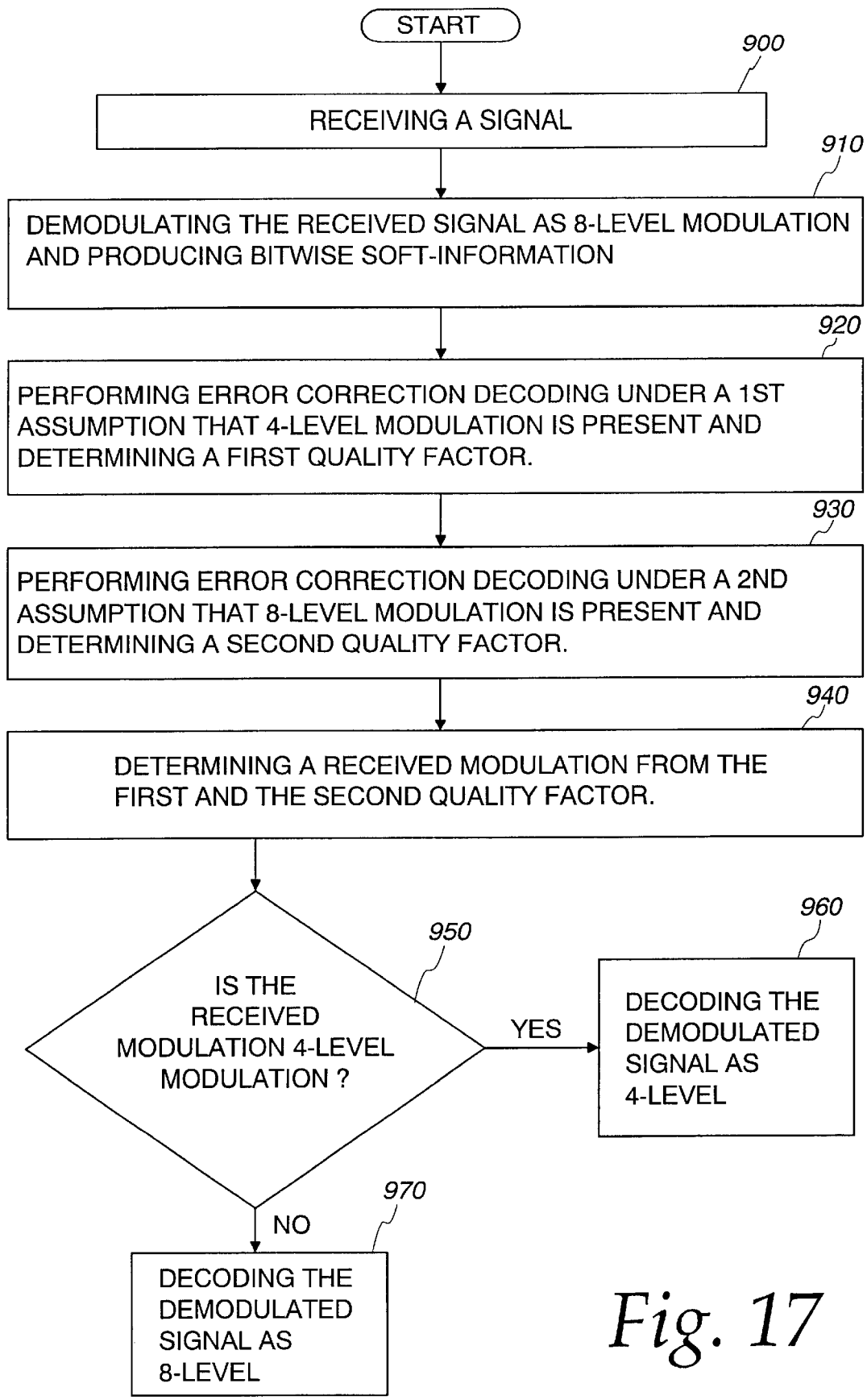
FIG. 17 is a flow chart illustrating the decoding of a received signal containing at least one of 4-level signaling symbols and 8-level signaling symbols in accordance with an embodiment of the invention.

FIG. 17 is a flow chart showing the steps performed by the inventive error correction decoder 340 while decoding a received signal containing at least one of 4-level signaling symbols and 8-level signaling symbols in accordance with the invention. The method begins in step 900 where a transmitted signal 802 is received by a reception antenna 320. The transmitted signal 802 enters receiver down converter 325 where transmitted signal 802 is down converted. The down converted signal is then digitized by analog-to-digital converter 330. The method then continues in step 910 by demodulating the signal using demodulator 840, which may be an 8-PSK adaptive equalizer suitable for demodulating 8-PSK modulation to compensate for ISI added in the transmission path. The 8-PSK demodulator 840 generally applies the MLSE process commonly known as the Viterbi algorithm. 8-PSK demodulator 840 preferably outputs soft decisions to the inventive error correction decoder 340.

The method continues on to step 920 where error correction decoder 340 decodes the soft symbol information from 8-PSK demodulator 840 as QPSK symbols and determines a first quality factor. If the error correction decoder 340 was operating in the unconstrained mode prior to step 920, the error correction decoder switches to the constrained mode by using an interleaver that only places bits in the 2-bit positions of the 3-PSK soft values that correspond to the 2-bits of QPSK, as described above in relation to FIG. 15. The method continues to step 930 where error correction decoder 340 decodes the soft symbol information as 8-PSK signaling symbols and determines a second quality factor. Because the error correction decoder 340 is operating in the constrained mode prior to step 930, it must operate in the unconstrained mode as described above in relation to FIG. 15. These first and second quality factors are similar to the quality factors mentioned above in conjunction with FIG. 14. The first and second quality factors may be determined from the metrics generated during the MLSE process performed by error correction decoder 340.

The method continues in step 940, where a received modulation is determined from the first and second quality factors. If the received modulation is QPSK symbols in step 950, the method continues to step 960 where the soft information is decoded as QPSK symbols. If, however, it is determined that the received modulation is 8-PSK, the soft information is decoded as 8-PSK symbols. In this way, error correction decoder 340 is able to decode a received signal containing both QPSK and 8-PSK modulation.

Figure 18:
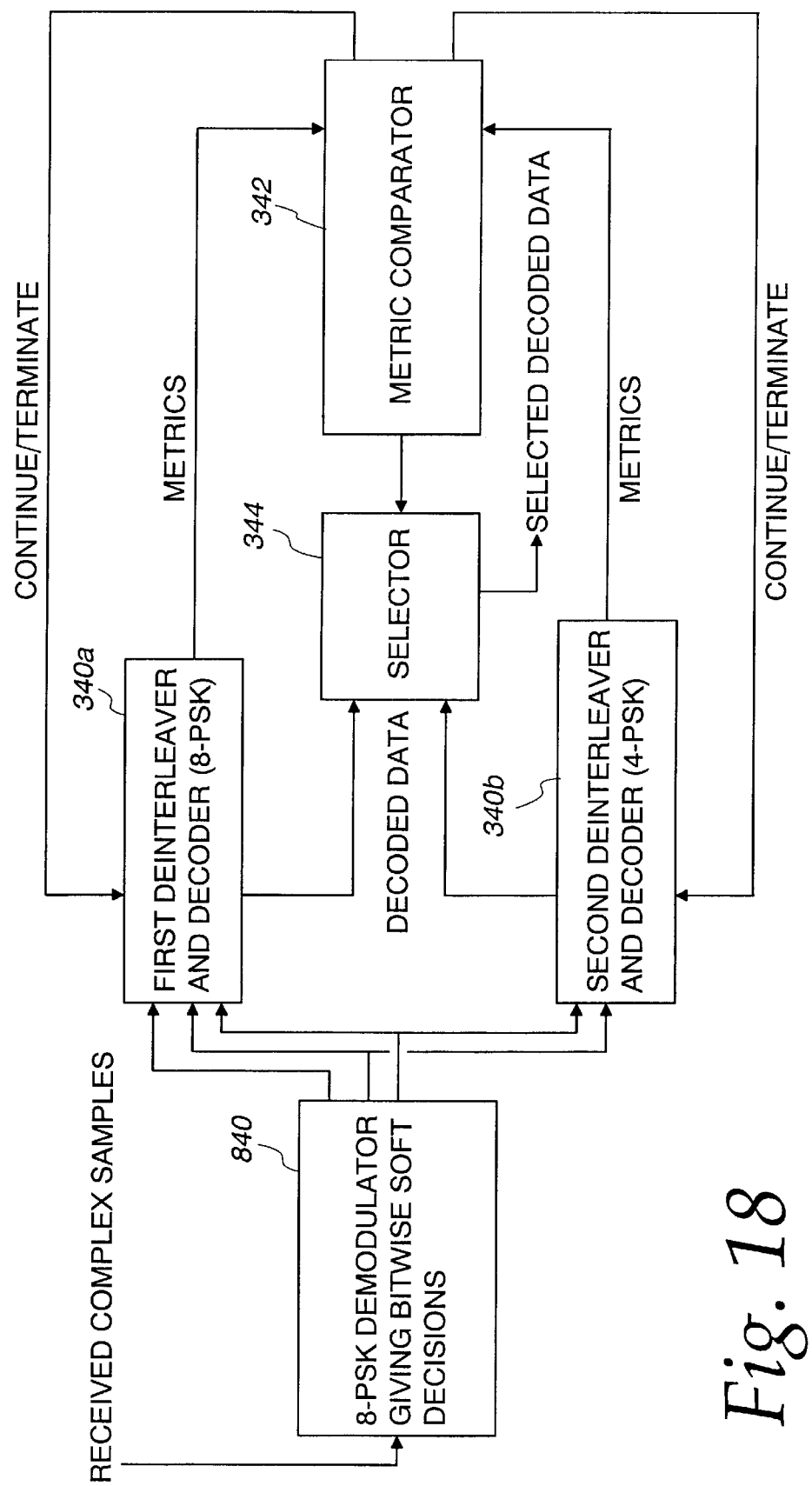
FIG. 18 is a functional block diagram illustrating a 4-level/8-level error correction decoder in accordance with an embodiment of the invention.

FIG. 18 is a functional block diagram illustrating selection of operation modes for error correction decoder 340. FIG. 18 shows an 8-PSK demodulator 840 coupled to error correction decoder 340 which is represented by error correction decoder 340a for decoding under the assumption that 8-PSK modulation was received, and error correction decoder 340b for decoding under the assumption QPSK modulation was received. Error correction decoder 340a and error correction decoder 340b are both coupled to selector 344 and to metric comparator 342. Metric comparator 342 is further coupled to selector 344.

In operation, received complex samples are received by 8-PSK demodulator 840 which provides bitwise soft decision information to decoder 340a and decoder 340b. Decoder 340a includes a first deinterleaver utilizing a deinterleaver scheme under the assumption that 8-PSK modulation was received. Decoder 340b includes a second deinterleaver utilizing a second deinterleaving scheme under the assumption that QPSK modulation was received. Metrics are generated for error correction decoder 348, operating under the assumption that 8-PSK modulation was received and sent to metric comparator 342. Similarly, QPSK metrics are generated by error correction decoder. 340b, operating under the assumption that QPSK modulation was received, and sent to metric comparator 342. The metric comparator 342 compares the 8-PSK metrics and the QPSK metrics, from which a decision is made of whether 8-PSK or QPSK modulation is present in the received signal. If metric comparator 342 determines that 8-PSK modulation is present, metric comparator 342 indicates to selector 344 to select the decoded data from error correction decoder 340a for further processing. However, if metric comparator 342 determines that QPSK modulation is present in the received signal, metric comparator 342 indicates to selector 344 to allow the error correction decoder 340b decoded data to the output for further processing. Metric comparator 342 may make this determination from the metrics generated as discussed in relation to FIG. 15 supra.

Error correction decoder 340 utilizes the MLSE processor as described in FIG. 15. Further, as previously mentioned, when performing the method set out in FIG. 17, error correction decoder 340 may be able to determine whether QPSK or 8-PSK signaling symbols are present during the first 25% of decoding and switch operation modes accordingly, thereby saving time and battery power by not having to completely decode the signal using both decoding methods. In a similar manner as shown in steps 640, 645, 660, and 665 of FIG. 14, the error correction decoder 340 may also be evaluated for accuracy, where if it is found that the decoding methods are not accurate, the method will return to step 900.

Figure 19:
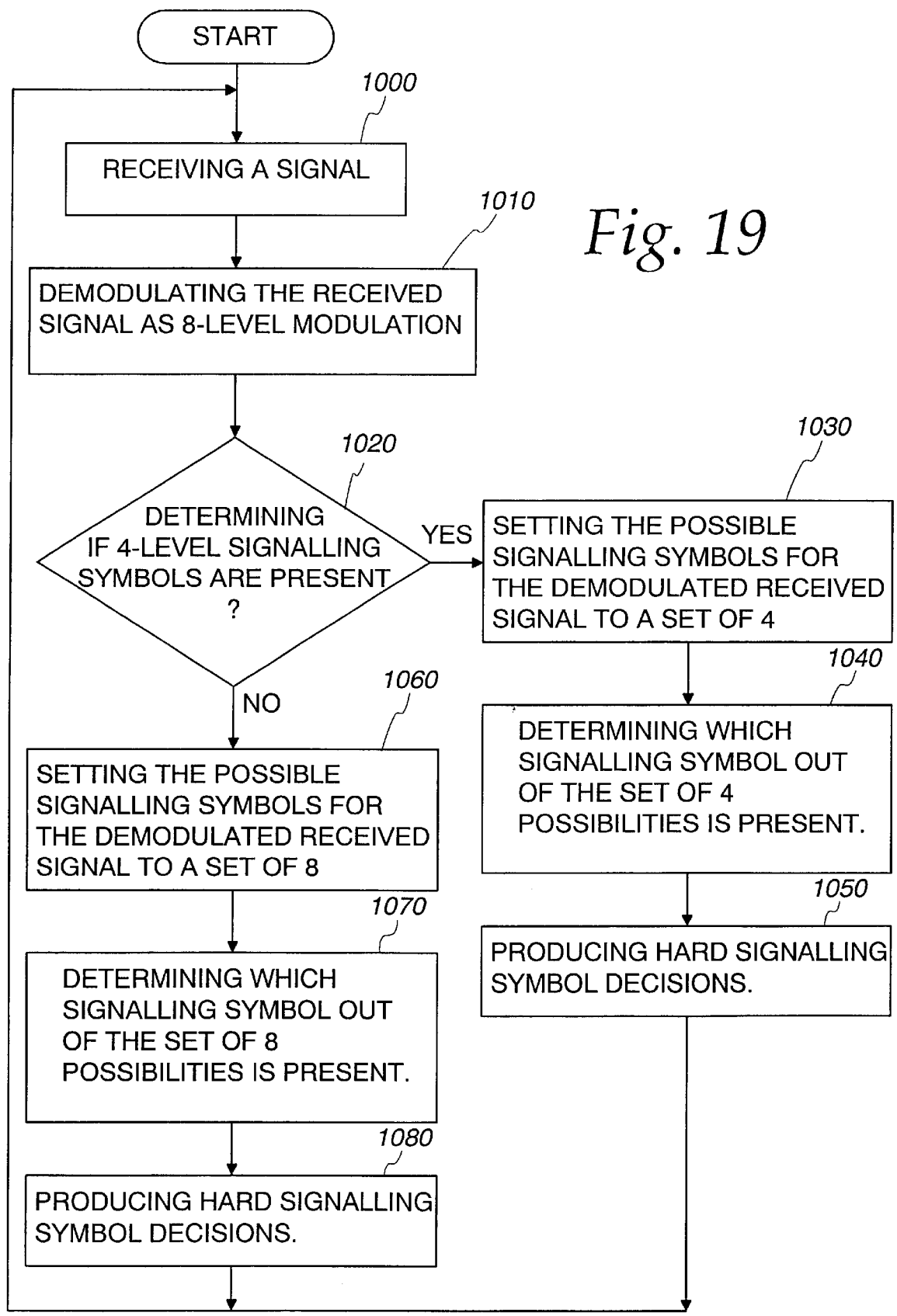
FIG. 19 is a flow chart illustrating the decoding of a received signal containing at least one of 4-level signaling symbols and 8-level signaling symbols in accordance with an embodiment of the invention.

FIG. 19 is a flow chart showing the steps carried out by the inventive error correction decoder to decode a received signal containing at least one of 4-level signaling symbols and 8-level signaling symbols. The method begins at step 1000 where a transmitted signal 802 is received by reception antenna 320. The signal is down-converted and converted to a digitized signal by receiver down-converter 325 and analog to digital converter 330, respectively. The method continues to step 1010 where the received signal is demodulated as 8-level modulation by demodulator 840 as known in the art, and the method then continues to step 1020 where the error correction decoder 340 determines if QPSK symbols are present. Error correction decoder 340 could use an indication signal within the transmitted signal, a control signal sent at call setup, or a predetermined transmission format to determine whether to operate in an unconstrained or a constrained operational mode in the manner similar to that discussed above in relation to FIG. 13.

If it is determined that QPSK symbols are present, the method continues to step 1030 where the signaling symbol possibilities for the demodulated received signal is set to 4. The method then continues to step 1040 where it is determined which signaling symbol out of the set of 4 possibilities is present. If the error correction decoder 340 was operating in an unconstrained mode prior to performing steps 1030 and 1040, the error correction decoder 340 use an interleaver that only places bits in the 2-bit positions of the 3-PSK soft values that correspond to the 2-bits of QPSK, as discussed in relation to FIG. 15 above. In step 1050, the method continues by producing hard signaling symbol decisions from the determination in step 1040. The method then returns to step 1000. The hard signaling symbol decisions are further processed by the system to provide, for example, speech, data and signaling information for the system and the users thereof.

If, however, it is determined that QPSK signaling symbols are not present in step 1020, the method continues to step 1060 where the error correction decoder 340 sets the possible signaling symbols for the demodulated received signal to a set of 8. The method then continues on to step 1070 where it is determined which signaling symbol out of the set of eight possibilities is present. If the error correction decoder 340 was operating in a constrained mode prior to performing steps 1060 and 1070, the error correction decoder 340 must operate in the unconstrained mode for decoding 8-PSK, as discussed in relation to FIG. 15 above. The method then continues in step 1080 by producing hard signaling symbol decisions based on the determination of step 1070. The method then returns to step 1000.

In situations where a 4-level signaling symbol has been expanded and transmitted by an 8-level modulator to produce 8-level modulation, the inventive error correction decoder 340 may decode the received information as 8-level signaling symbols and remove/ignore the third bit when creating the hard symbol decisions. In this way, the inventive error correction decoder is able to create 4-level hard-signaling symbol decisions representing the 4-level symbol sequence originally expanded and transmitted.

As mentioned above, 4-level signaling symbols may be QPSK signaling symbols; however, it need not be limited to such. 4-level signaling symbols could include DQPSK and II/4-DQPSK signaling symbols or any combination thereof as well. Additionally, 8-level signaling symbols need not be limited to 8-PSK signaling symbols. 8-level signaling symbols could include 8-DPSK and II/4-8DPSK signaling symbols, or any combination thereof as well. Furthermore, although the inventive modulator, constrained/unconstrained demodulator, and constrained/unconstrained error correction decoder have been described with respect to a Time Division Multiple Access cellular telephone system, they would be applicable to a code division multiple access cellular telephone system as well.

Furthermore, the concepts of switching the number of path histories and the number of new symbol hypothesis which allow the inventive constrained/unconstrained demodulator to handle both 4-level and 8-level signaling symbols, and the concepts of using an interleaver that only places bits in the 2-bit position of the 3-PSK soft values that correspond to the 2-bits of QPSK could be applied to a decodulator as well, where the number of path histories and new symbol hypothesis utilized in the MLSE processor of the decodulator, and the interleaver would be altered in the same manner discussed herein.

Thus, a method and system for the transmission, reception and the processing of 4-level and 8-level signaling symbols has been provided. An inventive modulator is provided for modulating 4-level signaling symbols using an 8-level modulator. Further, this inventive modulator is able to produce 4-level modulation using an 8-level modulator, where the 4-level modulation represents the expanded 4-level symbol sequence modulated. This inventive modulator allows either less speech compression yielding improved speech quality, or a higher bit rate increasing the quality of the data communication system, without reducing the number of users that can be accommodated by the cellular system. Further, as only one modulator is necessary to modulate both 4-level and 8-level signaling symbols, production costs for the cellular system as well as the size of a cellular station are reduced.

Furthermore, a constrained/unconstrained modulator is provided which is able to demodulate both 4-level signaling symbols and 8-level signaling symbols. Additionally, an error correction decoder is provided which is also able to decode a demodulated signal which contains both 4-level and 8-level signaling symbols. These inventive demodulator and error correction decoder are useful in situations where some cellular stations possess QPSK modulation capability only, and other stations possess 8-PSK capabilities. The inventive modulator and error correction decoder have the distinct advantage of being able to communicate to both. Furthermore, as multiple demodulators and error correction decoders are not required to handle both 4-level and 8-level signaling symbols, the cellular station can be built with reduced component size and cost.

While a particular embodiment of the present has been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method of modulating 4-level signaling symbols using an 8-level modulator, the method comprising:
   receiving 4-level signaling symbols to be modulated, each 4-level signaling symbol containing 2-bits of information;
   expanding said 4-level signaling symbols into expanded 4-level signaling symbols, each expanded 4-level signaling symbol containing 3-bits of information and constrained to one of four possible values corresponding to four points of an 8-point signaling constellation; and
   modulating said expanded 4-level signaling symbols using an 8-level modulator.

2. The method of claim 1, wherein the step of expanding said 4-level signaling symbols into expanded 4-level signaling symbols includes manufacturing a third bit for each 4-level signaling symbol and appending said third bit to said 2-bits of information.

3. The method of claim 2 wherein said third bit is the exclusive-OR of said 2-bits.

4. The method of claim 1 further comprising performing a progressive 45° phase shift between a modulation of consecutive symbols.

5. The method of claim 1 wherein modulating an expanded 4-level signaling symbol with the 8-level modulator causes the 8-level modulator to produce 4-level modulation.

6. The method of claim 1 wherein said 4-level signaling symbols are a subset of said 8-level signaling symbols.

7. The method of claim 1 further comprising the step of sending an indication signal indicating which of expanded 4-level signaling symbols and 8-level signaling symbols are being transmitted.

8. A system for modulating 4-level signaling symbols using an 8-level signaling symbol modulator comprising:
   a processor for processing information into a plurality of 4-level signaling symbols to be modulated;
   an expander coupled to said processor for expanding said plurality of 4-level signaling symbols each containing 2-bits of information to expanded 4-level signaling symbols each containing 3-bits of information; and constrained to one of four possible values corresponding to four points of 8-point signaling constellation and
   an 8-level modulator coupled to said expander for modulating said expanded 4-level signaling symbols.

9. The system of claim 8 wherein said expander expands said plurality of 4-level signaling symbols by XORing said 2-bits of information to generate a third bit and appends said third bit to said 2-bits of information.

10. The system of claim 8 wherein said 8-level modulator applies a progressive 45° phase shift between a modulation of consecutive symbols.

11. The system of claim 8 wherein said 4-level signaling symbols are a subset of said expanded 8-level signaling symbols.

12. The system of claim 8 wherein said 8-level modulator produces 4-level modulation when modulating said expanded 8-level signaling symbols.

13. The system of claim 8 wherein said information processed by said processor indicates a presence of said expanded 8-level signaling symbols.

14. The system of claim 8 wherein said processor processes information into a plurality of 8-level signaling symbols.

* * * * *